United States Patent
Valentine et al.

(10) Patent No.: US 7,062,447 B1
(45) Date of Patent: Jun. 13, 2006

(54) IMPUTED VARIABLE GENERATOR

(75) Inventors: Suzanne Valentine, Atlanta, GA (US); Krishna Venkatraman, Menlo Park, CA (US); Phil Delurgio, Dana Point, CA (US); Michael Neal, San Francisco, CA (US); Hau Lee, Los Alto, CA (US)

(73) Assignee: Demandtec, Inc., San Carlos, CA (US)

( * ) Notice: Subject to any disclaimer, the term of this patent is extended or adjusted under 35 U.S.C. 154(b) by 600 days.

(21) Appl. No.: 09/742,472

(22) Filed: Dec. 20, 2000

(51) Int. Cl.
G06F 17/60 (2006.01)
G06F 15/21 (2006.01)

(52) U.S. Cl. .............................. 705/1; 705/20; 705/40; 705/7; 705/8; 703/2; 703/6; 700/28; 395/207

(58) Field of Classification Search ............... 705/400, 705/40, 1, 20
See application file for complete search history.

(56) References Cited

U.S. PATENT DOCUMENTS

| | | | |
|---|---|---|---|
| 3,017,610 A | 1/1962 | Auerback et al. | |
| 4,744,026 A | 5/1988 | Vanderbei | |
| 5,063,506 A | 11/1991 | Brockwell et al. | 364/402 |
| 5,117,354 A | 5/1992 | Long et al. | 364/401 |
| 5,212,791 A | 5/1993 | Damian et al. | |
| 5,249,120 A | 9/1993 | Foley | 364/401 |
| 5,299,115 A | 3/1994 | Fields et al. | 364/401 |
| 5,377,095 A * | 12/1994 | Maeda et al. | 705/10 |
| 5,459,656 A | 10/1995 | Fields et al. | 364/401 |
| 5,521,813 A | 5/1996 | Fox et al. | |
| 5,694,551 A | 12/1997 | Doyle et al. | |
| 5,712,985 A | 1/1998 | Lee et al. | 395/207 |
| 5,732,401 A | 3/1998 | Conway | 705/29 |
| 5,765,143 A | 6/1998 | Sheldon et al. | |
| 5,790,643 A | 8/1998 | Gordon et al. | |
| 5,799,286 A | 8/1998 | Morgan et al. | 705/30 |
| 5,822,736 A | 10/1998 | Hartman et al. | 705/1 |
| 5,873,069 A | 2/1999 | Reuhl et al. | 705/20 |
| 5,878,400 A | 3/1999 | Carter, III | 705/20 |
| 5,918,209 A | 6/1999 | Campbell et al. | 705/5 |
| 5,933,813 A | 8/1999 | Teicher et al. | |
| 5,987,425 A | 11/1999 | Hartman et al. | 705/20 |

(Continued)

FOREIGN PATENT DOCUMENTS

WO     WO 98/53415     11/1998

OTHER PUBLICATIONS

Merriam-Webster's collegiate dictionary, 10th ed.*

(Continued)

*Primary Examiner*—Firmin Backer
*Assistant Examiner*—Daniel L. Greene
(74) *Attorney, Agent, or Firm*—Kang Lim

(57) ABSTRACT

Disclosed are methods, media and systems for generating imputing econometric variables from raw econometric data. A method for generating cleansed initial dataset from corrected raw econometric data comprises inputting raw econometric data, formatting and classifying the raw econometric, conducting an initial error detection and correction, defining a store data set hierarchy, conducting a second error detection and correction, defining product attributes and demand groups, updating attribute information, defining equivalizing factors, conducting a third error detection and correction, subsetting data to facilitate increased processing speeds, conducting a fourth error detection and correction and outputting the cleansed initial dataset. Another embodiment, capable of generating imputing econometric variables from corrected raw econometric data comprises receiving the raw econometric data, detecting errors in the raw econometric data, correcting the detected errors in the raw econometric data to generate a cleansed initial dataset, and generating imputed econometric variables using the cleansed initial dataset.

18 Claims, 18 Drawing Sheets

U.S. PATENT DOCUMENTS

| | | | |
|---|---|---|---|
| 6,009,407 A | 12/1999 | Garg | 705/10 |
| 6,029,139 A | 2/2000 | Cunningham et al. | 705/10 |
| 6,032,123 A | 2/2000 | Jameson | 705/8 |
| 6,032,125 A | 2/2000 | Ando | 705/10 |
| 6,044,357 A | 3/2000 | Garg | |
| 6,052,686 A | 4/2000 | Fernandez et al. | |
| 6,078,893 A | 6/2000 | Ouimet et al. | 705/10 |
| 6,094,641 A | 7/2000 | Ouimet et al. | 705/10 |
| 6,125,355 A | 9/2000 | Bekaert et al. | 705/36 |
| 6,134,534 A | 10/2000 | Walker et al. | |
| 6,173,345 B1 | 1/2001 | Stevens | |
| 6,202,070 B1 | 3/2001 | Nguyen et al. | |
| 6,205,431 B1 | 3/2001 | Willemain et al. | 705/10 |
| 6,321,207 B1 | 11/2001 | Ye | |
| 6,341,268 B1 | 1/2002 | Walker et al. | |
| 6,341,269 B1* | 1/2002 | Dulaney et al. | 705/22 |
| 6,397,193 B1 | 5/2002 | Walker et al. | |
| 6,405,175 B1 | 6/2002 | Ng | |
| 6,456,986 B1 | 9/2002 | Boardman et al. | |
| 6,546,387 B1 | 4/2003 | Triggs | |
| 6,553,352 B1 | 4/2003 | Delurgio et al. | |
| 6,567,824 B1 | 5/2003 | Fox | |
| 6,684,193 B1 | 1/2004 | Chavez et al. | |
| 6,697,824 B1 | 2/2004 | Bowman-Amuah | |
| 6,725,208 B1 | 4/2004 | Hartman et al. | |
| 6,910,017 B1 | 6/2005 | Woo et al. | |
| 2002/0023001 A1 | 2/2002 | McFarlin et al. | |
| 2002/0107819 A1 | 8/2002 | Ouimet | |
| 2002/0123930 A1 | 9/2002 | Boyd et al. | |
| 2002/0198794 A1 | 12/2002 | Williams et al. | |

OTHER PUBLICATIONS

Real-world Data is Dirty: Data Cleansing and the Merge/Purge Problem. vol. 2, Issue 1 (Jan. 1998) pp.: 9-37. 1998. ISSN 1384-5810.*

"Report of Novelty Search" by Patentec, dated Feb. 9, 2001.

Stephen J. Hoch et al., "Store Brands and Category Management", The Wharton School, University of Pennsylvania, Mar. 1998, pp. 1-38.

Bruce G.S. Hardie et al., "Attribute-based Market Share Models: Methodological Development and Managerial Applications", The Wharton School, University of Pennsylvania, Working Paper 98-009, pp. 1-48.

Alan Mercer, "Non-linear Price Effects", Journal of the Market Research Society, dated Jul. 1, 1996, p. 227.

Rockney G. Walters, "Assessing the Impact of Retail Price Promotions on Product Substitution, Complementary Purchase, and Interstore Sales Displacement", Journal of Marketing, vol. 55, Apr. 1991, pp. 17-28.

Robert C. Blattberg et al., "How Promotions Work", Marketing Science, vol. 14, No. 3, Part 2 of 2, 1995, pp. G122-G132.

Peter M. Guadagni et al., "A Logit Model of Brand Choice Calibrated on Scanner Data", Marketing Science, vol. 2, No. 3, Summer 1983, pp. 203-238.

Lee G. Cooper et al., "Standardizing Variables in Multiplicative Choice Models", Journal of Consumer Research, vol. 10, Jun. 1983, pp. 96-108.

Eileen Bridges et al., "A High-Tech Product Market Share Model with Customer Expectations'" Marketing Science, vol. 14, No. 1, Winter 1995, pp. 61-81.

Richard R. Batsell, et al., "A New Class of Market Share Models", Marketing Science, vol. 4, No. 3, Summer 1985, pp. 177-198.

Jagmohan S. Raju, "The Effect of Price Promotions on Variability in Product Category Sales", Marketing Science, vol. 11, No. 3, Summer 1992, pp. 207-220.

Robert J. Dolan, "How Do You Know When the Price Is Right?", Harvard Business Review, Sep.-Oct. 1995, pp. 5-11.

Fusun Gonul, "Modeling Multiple Sources of Heterogeneity in Multinomial Logit Models: Methodological and Managerial Issues", Marketing Science, vol. 12, No. 3, Summer 1993, pp. 213-229.

Robert M. Schindler et al., "Increased Consumer Sales Response through Use of 99-Ending Prices", Journal of Retailing, Jun. 1, 1996, p. 187.

Francis J. Mulhern et al., "The Relationship between Retail Price Promotions and Regular Price Purchases", Journal of Marketing, vol. 59, Oct. 1995, pp. 83-90.

John Deighton et al., "The Effects of Advertising on Brand Switching and Repeat Purchasing", Journal of Marketing, vol, XXXI, Feb. 1994, pp. 28-43.

Sunil Gupta, "Reflection on 'Impact of Sales Promotions on When, What, and How Much to Buy'", Journal of Marketing Research, vol. XXX, Nov. 1993, pp. 522-524.

Richard A. Briesch, "Does It Matter How Price Promotions Are Operationalized?", Marketing Letters 8:2 (1997), pp. 167-181.

Byung-Do Kim et al., "Modeling the Distribution of Price Sensitivity and Implications for Optimal Retail Pricing", Journal of Business & Economic Statistics, Jul. 1995, vol. 13, No. 3.

William R. Dillon et al., "A Segment-level Model of Category Volumn and Brand Choice", Marketing Science, vol. 15, No. 1, 1999, pp. 38-59.

Stephen J. Hoch et al., "Determinants of Store-Level Price Elasticity", Journal of Marketing Research, vol. XXXII (Feb. 1995), pp. 17-29.

Magid M. Abraham et al., "An Implemented System for Improving Promotion Productivity Using Store Scanner Data", Marketing Science, vol. 12, No. 3, Summer 1993.

Peter S. Fader et al., "Modeling Consumer Choice among SKUs", Journal of Marketing Research, vol. XXXIII (Nov. 1996), pp 442-452.

Rossi, Delurgio, & Kantor; "Making Sense of Scanner Data;" *Harvard Business Review*,Reprint F00205.

Bucklin & Gupta, "Brand Choice, Purchase Incidence, and Segmentation: An Integrated Modeling Approach," *Journal of Marketing Research,* May 1992, PP. 201-215, vol. XXIX.

Smith, Mathur, & Kohn; "Bayesian Semiparametric Regression: An Exposition and Application to Print Advertising;" Jan. 3, 1997; Australian Graduate School of Management, University of New South Wales, Sydnet 2052, Austrailia.

Blattberg and Deighton, "Manage Marketing by the Customer Equity;" *Harvard Business Review,* Jul.-Aug. 1996, PP. 136-144.

Christen, Gupta, Porter, Staelin, & Wittink; "Using Market-Level Data to Understand the Effectiveness of Promotional Activities;" Dec. 22, 1995.

Link, "Are Aggregate Scanner Data Models Biased?," *Journal of Advertising Research,* Sep./Oct. 1995, PP. RC8-RC12, ARF.

Russell & Kamakura, "Understanding Brand Competition Using Micro and Macro Scanner Data," *Journal of Marketing Research,* vol. XXXI (May 1994), PP. 289-303.

Jones, "The Double Jeopardy of Sales Promotions," *Harvard Business Review,* Sep.-Oct. 1999, PP. 145-152.

Buzzell, Quelch, & Salmon; "The Costly Bargain of Trade Promotion;" *Harvard Business Review,* Reprint 90201, Mar.-Apr. 1990, PP. 1-9.

Curry, Divakar, Mathur, & Whiteman; "BVAR as a Category Management Tool: An Illustration and Comparison With Alternative Techniques;" *Journal of Forecasting*, vol. 14, Iss No. 3 (1995), PP. 181-199.

"Report of Novelty Search" by Patentec, dated Jul. 25, 2001.

"PCT International Search Report", Application No. PCT/US02/14977, mailed May 5, 2003.

Dyer, Robert F. et al., "Case Studies in Marketing Decisions Using Expert Choice," Decision Support Software, 1988, pp. 2-7, 73-108.

"PCT International Search Report", Application No. PCT/US02/36710, mailed Jul. 21, 2003.

Yoeman, John Cornelius Jr., "The Optimal Offering Price for Underwritten Securities", 1993, vol. 55/01-A of Dissertation Abstracts International, p. 4743 (Abstract Only).

Andrew B. Gelman et al., "Bayesian Data Analysis", pp. 439-455, Chapman & Hall/CRC, First Edition 1995, Reprinted 2000.

"Webster's New World Dictionary", 2nd College edition, p. 721, The World Publishing Company, 1972.

Scherage, Dan, "You Do the Math," Chain Store Age, v76, n7, Jul. 2000.

"Gymboree Enhances Price Management," Retail Systems Alert, vol. 13, No. 6, Jun. 2000.

Binkley, James K.; Connor, John M., "Grocery Market Pricing and the New Competitive Environment." Journal of Retailing, v74, n2, Summer 1998.

"Report of Novelty Search" by Patentec, dated Jul. 25, 2001.

"Report of Novelty Search" by Patentec, dated Feb. 9, 2001.

"PCT International Search Report", Application No. PCT/US03/30488, mailed Jan. 28, 2004.

Bruce G.S. Hardie et al., "Attribute-based Market Share Models: Methodological Development and Managerial Applications", University of Pennsylvania, Working Paper 98-009, pp. 1-48, 1998.

Rossi, Delorgio, & Kantor; "Making Sense of Scanner data;" Harvard Business Review, Reprint F00205, 2000.

"Pacificorp IRP: Renewables Costs Must Drop 65% to be Competitive with Gas," dated Dec. 8, 1995.

Robert J. Dolan, "How Do You Know When the Price is Right?", Harvard Business Review, Sep.-Oct. 1995, P. 4-11.

Alan L. Montgomery and Peter R. Rossi, "Estimating Price Elasticities with Theory-Based Priors," Journal oof Marketing Research vol. XXXVI, Nov. 1999 (pp 413-423).

Boatwright, Peter et al., "Account-Level Modeling for Trade Promotion: An Application of a Constrained Parameter Hierarchical Model," Journal of the American Statistical Association, vol. 94, No. 448, Dec. 1999 (pp 1063-1073).

Alan L. Montgomery, "Creating Micro-Marketing Pricing Strategies Using Supermarket Scanner Data," Marketing Science, vol. 16, No. 4, 1997 (pp 315-337).

Robert C. Blattberg and Edward I. George, "Shrinkage Estimation of Price and Promotional Elasticities: Seemingly Unrelated Equations," Journal of the American Statistical Association, vol. 86, No. 414, Jun. 1991 (pp 304-315).

Arnold Zellner, "On Assessing Prior Distribution sand Bayesian Regression Analysis With G-Prior Distributions," Elsevier Science Publishers, 1986 (pp 233-243).

D.V. Lindley and A.F.M. Smith, "Bayes Estimates for the Linear Model," University College, Dec. 1971.

George C. Tiao and Arnold Zellner, "On the Bayesian Estimation of Multivariate Regression," University of Wisconsin, Jan. 1964.

Arnold Zellner, "An Efficient Method of Estimating Seemingly Unrelated Regressions and Tests for Aggregation Bias," University of Winconsin, Jun. 1962.

A.F.M. Smith, "A General Bayesian Linear Model," University of Oxford, Apr. 1972.

Flanagan, David, "Javascript: The Definitive Guide, 3rd Edition," published by O'Reilly in Jun. 1998 (ISBN 1-56592-392-8) section 14.8.

Berners-Lee, T., "Hypertext Markup Language 2.0 Working Paper," Nov. 1995 (pp. 1-3).

Tellis, Gerard J., and Fred S. Zufryden, "Tackling the Retailer Decision Maze: Which Brands to Discount, How Much, When and Why," Marketing Science, vol. 1, No. 34, 1995 (pp. 271-299).

Abraham, Magid M. and Leonard M. Lodish, "Promoter: An Automated Promotion Evaluation System," Marketing Science, vol. 6, No. 2, 1987 (p. 101-123).

Little, John D. C., "Brandaid: A Marketing-Mix Model, Part 1: Structure," Operations Research, vol. 23, No. 4, Jul.-Aug. 1975 (p. 628-655).

Cerf, Vinton G. and Robert E. Kahn, "A Protocol for Packet Network Interconnection," IEEE Transactions on Communications COM-22, May 1974, (p. 637-648).

Barth, Brad, "Shopko Tests Automated Markdowns", WWD Oct. 4, 2000, pp. 1-3.

Cook, Martie, "Optimizing Space and Sales with Markdown Software", Office.com, May 31, 2000, p. 1.

"Essentus and Spotlight Solutions Partnership Delivers Precise Markdown Decisions", Business Wire, Apr. 17, 2000, 3 pages.

Melcer, Rachel, "Local Tech Firm Creates Retail Markdown Tool", Business Courier online, Mar. 24, 2000, pp. 1-4.

Technology Strategy Incorporated, www.grossprofit.com, Mar. 2, 2000, pp. 1-20.

\* cited by examiner

IMPUTED VARIABLE GENERATOR

CROSS-REFERENCE TO RELATED APPLICATIONS

This application is related to co-pending and concurrently filed application Ser. No. 09/741,958, filed Dec. 20, 2000, entitled "Price Optimization System", by Michael Neal, Krishna Venkatraman, Suzanne Valentine, Phil Delurgio, and Hau Lee, which is incorporated by reference herein for all purposes.

This application is related to co-pending and concurrently filed application Ser. No. 09/741,956, filed Dec. 20, 2000, entitled "Econometric Engine", by Hau Lee, Suzanne Valentine, Michael Neal, Krishna Venkatraman, and Phil Delurgio, which is incorporated by reference herein for all purposes.

This application is related to co-pending and concurrently filed application Ser. No. 09/741,957, filed Dec. 20, 2000, entitled "Financial Model Engine", by Phil Delurgio, Suzanne Valentine, Michael Neal, Krishna Venkatraman, and Hau Lee, which is incorporated by reference herein for all purposes.

This application is related to co-pending and concurrently filed application Ser. No. 09/741,959, filed Dec. 20, 2000, entitled "Econometric Optimization Engine", by Krishna Venkatraman, Phil Delurgio, Suzanne Valentine, Michael Neal, and Hau Lee, which is incorporated by reference herein for all purposes.

TECHNICAL FIELD

The present invention relates generally to the field of econometric data modeling. In particular, the invention relates to methods, media and systems for receiving raw econometric data, cleansing that data, and generating imputed econometric variables from the cleansed econometric data.

BACKGROUND OF THE INVENTION

In the business environment, one of the critical decisions facing a business manager is determining the price at which each product is to be sold. Conventional techniques of determining an optimal product price generally rely on trial and error, managerial expertise, and even plain guesswork. One approach contemplated by the inventors is the use of highly precise econometric modeling. Econometric modeling determines the relationship between sales volume and various other economic factors (pricing, cost, promotion, seasonality, demographics, etc . . . ). Such modeling enables the generation of accurate prediction of sales volume. The related concept of financial modeling combines predicted sales volume with fixed and variable costs associated with stocking and selling products.

By using customized and precisely tuned econometric and financial models a user can identify an optimized solution (pricing, promotion, etc . . . ) given a particular goal (such as profit maximization) and a set of constraints (such as maximum price increase). For example, prices may be set with the goal of maximizing profit or demand or for a variety of other objectives. Profit is the difference between total revenue and costs. Total sales revenue is a function of demand and price, where demand is a function of price. Demand may also depend on the day of the week, the time of the year, the price of related items, location of a store, and various other factors. As a result, the function for forecasting demand may be very complex. Costs may be fixed or variable and may be dependent on demand. As a result, the function for forecasting costs may be very complex. For a chain of stores with tens of thousands of different products, forecasting costs and determining a function for forecasting demand is difficult. The enormous amounts of data that must be processed for such determinations are too cumbersome even when done by computer. Further, the methodologies used to forecast demand and cost require the utilization of non-obvious, highly sophisticated statistical processes.

It is desirable to provide an efficient process and methodology for determining the prices of individual items such that profit (or whatever alternative objective) is optimized.

SUMMARY OF THE INVENTION

The present invention meets this and other needs by providing methods, media and systems for receiving raw econometric data and outputting a cleansed initial dataset. Moreover, the principles of the present invention contemplate generating a plurality of imputed econometric variables based on the cleansed initial dataset. Furthermore, the cleansed initial dataset and the generated plurality of imputed econometric variables may be subjected to further data processing, including, without limitation, input into an optimization engine wherein said econometric data can be used to generate econometric information optimized over and for a wide range of business conditions.

One embodiment in accordance with the principles of the present invention takes raw econometric data provided by a client and subjects it to an error detection and correction scheme capable of cleansing the raw econometric data to generate a cleansed initial dataset.

In one embodiment in accordance with the principles of the present invention imputing econometric variables are generated using corrected raw econometric data, by a method comprising receiving the raw econometric data, detecting inconsistencies in the raw econometric, correcting the detected inconsistencies in the raw econometric data to generate a cleansed initial dataset, and generating imputed econometric variables using the cleansed initial dataset.

A further embodiment generates imputed variables such as an imputed base price variable, an imputed relative price variable, an imputed base volume variable, an imputed variable reflecting the effects of stockpiling, an imputed variable reflecting seasonal effects, an imputed variable reflecting day-of-the-week effects, an imputed variable reflecting promotional effects, and an imputed cross-elasticity variable.

These and other features and advantages of the present invention will be presented in more detail in the following specification of the invention and the accompanying drawings which illustrate by way of example the principles of the invention.

BRIEF DESCRIPTION OF THE DRAWINGS

For a fuller understanding of the present invention, reference is made to the accompanying drawings in the following Detailed Description of the Drawings. In the drawings.

Figure 1:
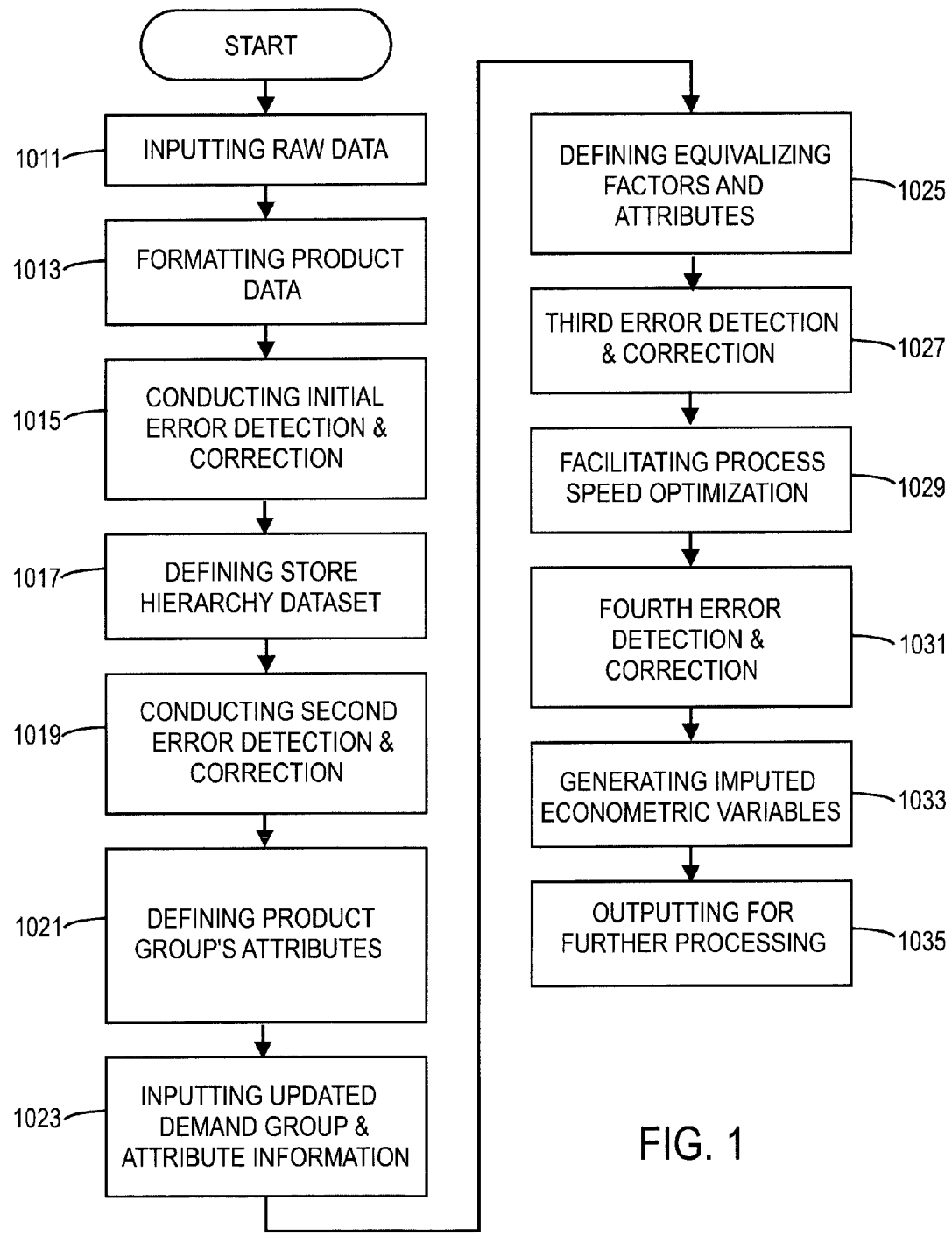
FIG. 1 is a flow chart depicting a process flow by which raw econometric data can be input, subject to "cleansing", and used to create an initial dataset which can then be used to generate imputed econometric variables in accordance with a preferred embodiment of the present invention.

Reference numerals refer to the same or equivalent parts of the present invention throughout the several figures of the drawings.

DETAILED DESCRIPTION OF THE DRAWINGS

Reference will now be made to the several drawings. Examples of the preferred embodiments are depicted in the accompanying drawings. While the invention will be described in conjunction with these preferred embodiments, it should be understood that it is not intended to limit the invention to one or more preferred embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The present invention provides methods, media and systems for generating a plurality of imputed econometric variables. Such variables are useful in that they aid businesses in determining the effectiveness of a variety of sales strategies. In particular, such variables can be used to gauge the effects of various pricing or sales volume strategies. Such method, media, and systems provide powerful tools for predicting and analyzing the economic behavior involving products, services, financial instruments, as well as a gamut of other related areas.

FIG. 1 illustrates a flowchart 1000 which describes steps of a method embodiment for data cleansing imputed econometric variable generation in accordance with the principles of the present invention. The process, generally described in FIG. 1, begins by initial dataset creation and data cleaning (Steps 1011–1031). This data set information is then used to generate imputed econometric variables (Step 1033) which can be output to and for other applications (Step 1035). The preferred implementation of data cleansing and imputed econometric variable generation is using a computer system to accomplish the many steps. Typically, the computer will include a computer-readable medium having programming instructions arranged to cleanse the raw econometric data in accordance with the principles of the present invention as elaborated upon extensively hereinbelow. In like manner, a computer can include a computer-readable medium having programming instructions arranged to generate imputed econometric variables in accordance with the principles of the present invention as also elaborated upon extensively hereinbelow.

Initial Dataset Creation and Cleaning

The process of dataset creation and cleaning (that is to say the process of identifying incompatible data records and resolving the data incomparability, also referred to herein as "error detection and correction") begins by inputting raw econometric data (Step 1011). The raw econometric data is then subject to formatting and classifying by UPC designation (Step 1013). After formatting, the data is subject an initial error detection and correction step (Step 1015). Once the econometric data has been corrected, the store information comprising part of the raw econometric data is used in defining a store data set hierarchy (Step 1017). This is followed by a second error detecting and correcting step (Step 1019). This is followed by defining a group of products which will comprise a demand group (i.e., a group of highly substitutable products) and be used for generating attribute information (Step 1021). Based on the defined demand group, the attribute information is updated (Step 1023). The data is equivalized and the demand group is further classified in accordance with size parameters (Step 1025). The demand group information is subjected to a third error detection and correction step (Step 1027). The demand group information is then manipulated to facilitate decreased process time (Step 1029). The data is then subjected to a fourth error detection and correction step (Step 1031), which generates an initial cleansed dataset. Using this initial cleansed dataset, imputed econometric variables are generated (Step 1033). Optionally, these imputed econometric variables may be output to other systems for further processing and analysis (Step 1035).

The process begins by inputting raw econometric data (Step 1011). The raw econometric data is provided by a client. The raw econometric data includes a variety of product information. It should be stated here that the range of products to which the principles of the present invention may be applied is vast. Such products can include, but are not limited to, soft drinks, automobiles, steel, precious stones, etc. Further, "product" as used herein refers to more than just articles of manufacture. It may be applied to the entire range of articles involved in commercial endeavor e.g., services, financial instruments, bank notes, mortgages, and many other things. All can be modeled in accordance with the principles of the present invention.

Returning to input of raw econometric data (Step 1011), the raw econometric data must specify the store from which the data is collected, the time period over which the data is collected and include a UPC (Universal Product Code) for the product, and provide a UPC description of the product. Also, the raw econometric data must include product cost (e.g., the wholesale cost to the store), number of units sold, and either unit revenue or unit price. Ordinarily, the UPC description also identifies the product brand, UOM (Unit of Measure), and product size. Such information can be very detailed or less so. For example, brand can simply be Coca-Cola®, or more detailed e.g., Cherry Coca-Cola®. A UOM is, for example, ounces (oz.), pound (lb.), liter (ltr), or count (CT), tons, gallons (gal.). Size reflects the number of UOM's e.g., eight (8) oz or two (2) ltr. Also, the general category of product or department identification is input. A category is defined as a set of substitutable or complementary products, for example, "Italian Foods". Such categorization can be proscribed by the client, or defined by generally accepted product categories. Additionally, such categorization can be accomplished using look-up tables or computer generated product categories.

Also, a more complete product descriptor is generated using the product information described above and, for example, a UPC description of the product and/or a product description found in some other look-up table (Step 1013). This information is incorporated into a product format. This product format provides a more complete picture of the product, but this information is stored in a separate database which is not necessarily processed using the invention. This information provides a detailed description of the product which can be called up as needed.

The data is then subjected to a first error detection and correction process (Step 1015). Typically, this step includes the removal of all duplicate records and the removal of all records having no match in the client supplied data (typically scanner data). An example of records having no match (i.e. records inconsistent with client data) are records that appear for products that the client does not carry or stock in its stores. These records are detected and deleted.

Data subsets concerning store hierarchy are defined (Step 1017). This means stores are identified and categorized into various useful subsets. Typical subsets include (among other categorizations) stores segregated by, for example, zip codes, cities, states, specific geographical regions, rural environs, urban environs, associations with other stores (e.g., is this store part of a mall) or categorized by specific stores. A wide variety of other subsets may also be used. These subsets can be used to provide information concerning, among other things, regional or location specific economic effects.

The data is then subjected to a second error detection and correction process (Step 1019). This step cleans out certain obviously defective records. Examples include, but are not limited to, records displaying negative prices, negative sales volume, or negative cost. Records exhibiting unusual price information are also removed. This means that records having information inconsistent with cross-store distribution are removed from the dataset. One example of such information is price information. Such unusual (inconsistent) prices can be detected using cross-store price comparisons (between similarly situated stores), for example, an average price for a product in the stores of a particular geographic region can be determined by averaging the prices for all such products sold in the subject stores. The standard deviation can also be calculated. Prices that lie at greater than, for example, two (2) standard deviations from the mean price will be treated as inconsistent and such records will be deleted. These tools can be applied to a variety of product parameters (e.g., price, cost, sales volume) to remove inconsistent data.

This is followed by defining groups of products and their attributes and exporting this information to a supplementary file (e.g., a text file)(Step 1021). This product information can then be output into a separate process which can be used to define demand groups or product attributes. For example, this supplemental file can be input into a computer "spreadsheet" program (e.g., Excel®) which can use the product information to define "demand groups" (i.e. groups of highly substitutable products). Also, further product attribute information can be acquired and added to the supplementary file. Such attributes can comprise, for example, branding information, manufacturer, size, flavor or form (e.g., cherry soda) just to name a few. Such information can be gleaned from multiple sources e.g., UPC product catalogues, the client, product look-up tables, or other sources. The advantage of such supplementary files is that they maintain complete product information (including information not required by the processes of the present invention) which can be accessed when needed. In addition, updated demand group and attribute information can then be input as received (Step 1023). By maintaining a supplementary file containing large amounts of data, a more streamlined (abbreviated) dataset may be used in processing. This effectively speeds up processing time by deleting non-critical information from the dataset.

The data is further processed by defining an "equivalizing factor" for the products of each demand group in accordance with size and UOM parameters (Step 1025). This equivalizing factor can be provided by the client or imputed. An example of determining an imputed equivalizing factor follows. Product size and UOM information are obtained, for example, from the product description information. Typical examples of such size and UOM information is, 20 oz. (ounce), 6 CT (count), or 1 ltr (liter). A further advantageous aspect of the present invention is that, even if such size or UOM information is incomplete or not provided, it can also be imputed, i.e., inferred or arrived at from known or assumed data, or derived by reasoning. An equivalizing factor can be imputed by using, for example, the median size for each UOM. Alternatively, some commonly used arbitrary value can be assigned. Once this information is gathered, all product prices and volume can be "equivalized". In one example, a demand group (a group of highly substitutable products) is chosen having, for example, "soft drinks"

as its subject category. And by further example, the soft drink product comes in 8, 12, 16, 24, 32, and 64 ounce sizes. The median size (or for that matter, any arbitrarily determined size) can then be used as the base size to which all other sizes are to be equivalized. For example, using the 8, 12, 16, 24, 32, and 64-ounce sizes discussed above, an arbitrary base size can be determined as, for example, 24 ounces. Then the 24-ounce size is determined as the equivalizing factor. Some of the uses of the equivalizing factors are detailed in the discussions below. Chiefly, the purpose of determining an equivalizing factor is to facilitate comparisons between different size products in a demand group. For example, if 16 is determined as the equivalizing factor for the above group of soft drinks, then an 8 oz. soft drink is equivalized to one half of a 16 oz. unit. In a related vein, a 32 oz. soft drink is equivalized to two (2) 16 oz. units.

Additionally, size information can be used to define further product attributes. For example, if the size is in the bottom tertile of sizes for that product, it will be classified as "Small" size. Correspondingly, if the size is in the middle tertile of sizes for that product, it will be classified as "Medium" size, and if the size is in the top tertile of sizes for that product, it will be classified as "Large" size. Such categorization can define product attributes such as small (8- and 12-ounce sizes), medium (16- and 24-ounce sizes), and large (32- and 64-ounce sizes) sizes.

The data is then subjected to a third error detection and correction process, which detects the effects of closed stores and certain other erroneous records (Step 1027). Keeping in mind that one advantage of the present invention is that very little client input is required to achieve accurate results, the inventors contemplate error correction without further input (or very little input) from the client. In accord with the principles of the invention, stores that demonstrate no product movement (product sales equal to zero) over a predetermined time period are treated as closed. In a preferred embodiment, the predetermined time period is three (3) months. Closed stores and their records are dropped from the dataset for those dates after store closure.

With continued reference to FIG. 1, Step 1027, the third error detection and correction also includes analysis tools for detecting the presence of discrepant records (e.g., duplicate records). The data is analyzed, in particular checking records for, date, product type, store at which the product was sold (or just "store"), price, units (which refers variously to units sold or unit sales volume), and causal variables. Causal variables are those factors which influence sales volume (a variable which can cause an increase in product sales e.g., coupons, sales promotion ads, sale prices, sale price on some complementary product, enhanced sales displays, more advantageous sales location within a store, etc.). Analysis is performed to remove the discrepant records such that only one of the records is kept as part of the analyzed data and that causal information for a particular time period is recorded.

Using the following illustrative table:

| Record Number | Date | Store | Product | Units | Price | Causal Variable |
|---|---|---|---|---|---|---|
| 1 | Dec. 5 | Y | D | 10 | 1.99 | 1 |
| 2 | Dec. 5 | Y | D | 10 | 1.99 | 1 |
| 3 | Dec. 12 | Y | D | 10 | 1.99 | 1 |
| 4 | Dec. 12 | Y | D | 15 | 1.89 | 2 |
| 5 | Dec. 19 | Y | D | 12 | 1.99 | 1 |
| 6 | Dec. 26 | Y | D | 9 | 1.99 | 1 |

For example, using record #1, the date of record is 12/12, the store is store "Y", the product is product type "D", units sold for that date are 10 at a price of 1.99. The causal variable is usually abbreviated with a code symbol (e.g., numbers). Here, "1" is a symbol for no causal variable, i.e., normal sales conditions. Whereas, examining, for example, record #3 includes a causal variable (code symbol 2) which, for example, will represent an advertisement concerning product "D".

Discrepant records are identified and corrected. For example, if two records have the same exact values (such as record #1 and record #2), it is assumed that one such record is an erroneous duplicate and only one record is kept as part of the analyzed dataset, for example, only record #1 is retained.

If two records with the same date, product id, and store id have multiple records with different causals, they are combined into a single record, with the two prices maintained in separate dataset variables, units summed across the two records, and the causal variables representing something other than a normal state being represented by new dataset variables.

The following table is a corrected version of the above table. Record 2 was deleted because it is identical to Record 1. Records 3 and 4 were combined into a single record (i.e., combined into a single Record 3) with new causal variables defined for Advertisement and Advertisement Price. Records 5 and 6 did not change because there was no duplicate information.

| Record Number | Date | Store | Product | Units | Regular Price | Advertisement | Advertisement Price |
|---|---|---|---|---|---|---|---|
| 1 | Dec. 5 | Y | D | 25 | 1.99 | No | — |
| 3 | Dec. 12 | Y | D | 25 | 1.99 | Yes | 1.89 |
| 5 | Dec. 19 | Y | D | 12 | 1.99 | No | — |
| 6 | Dec. 26 | Y | D | 9 | 1.99 | No | — |

A further correction can be made for records having the same date and causal value but have differing prices or differing number of units sold. First, a data discrepancy must be detected. For example, if a record on a specific date in the same store for the same product and causal state has two different values for units, this is a discrepancy. Correction can be accomplished by, first calculating the average number of units sold over all dates in the modeled time interval. The discrepant records are compared with the average value. The record having the unit value closest to the calculated average units is kept and the other is discarded. The same general process can be followed for records having discrepancies as to price (i.e., the record having the price closest to average price is kept). If both price and units are determined to have a discrepancy, the record having the price and unit values closest to the average price and average units is kept.

After all the duplicate records eliminated, the data is reconstructed. The data can be reviewed again to insure all duplicates are removed. Optionally, an output file including all discrepancies can be produced. In the event that it becomes necessary, this output file can be used as a follow-up record for consulting with the client to confirm the accuracy of the error detection and correction process.

Additionally, reduced processing times may be achieved by reformatting the data (Step 1029). For example, groups of related low sales volume products (frequently high priced items) can optionally be aggregated as a single product and processed together. Additionally, the data may be split into conveniently sized data subsets defined by a store or groups of stores which are then processed together to shorten the processing times. For example, all stores in the state of California can be processed together, then all the stores in Texas, etc.

Next, the process includes conducting a fourth error detection and correction step including determining the nature of missing data records and resolving remaining data inconsistencies concerning, for example, price, sales volume, and causal variables (Step 1031). For example, missing records can be analyzed by introducing the data into a data grid divided into a set of time periods. The time periods can be preset, computer determined, or user defined. The time periods can include, but are not limited to, months, weeks, days, or hours. One preferred embodiment uses time periods of one week. The data grid so constructed is analyzed. For the time periods (e.g., weeks) having no records a determination must be made. Is the record missing because:

a. there were no sales that product during that week (time period);

b. the product was sold out and no stock was present in the store during that time period (this situation is also referred to herein as a "stock-out");

c. the absence of data is due to a processing error.

Figure 2:
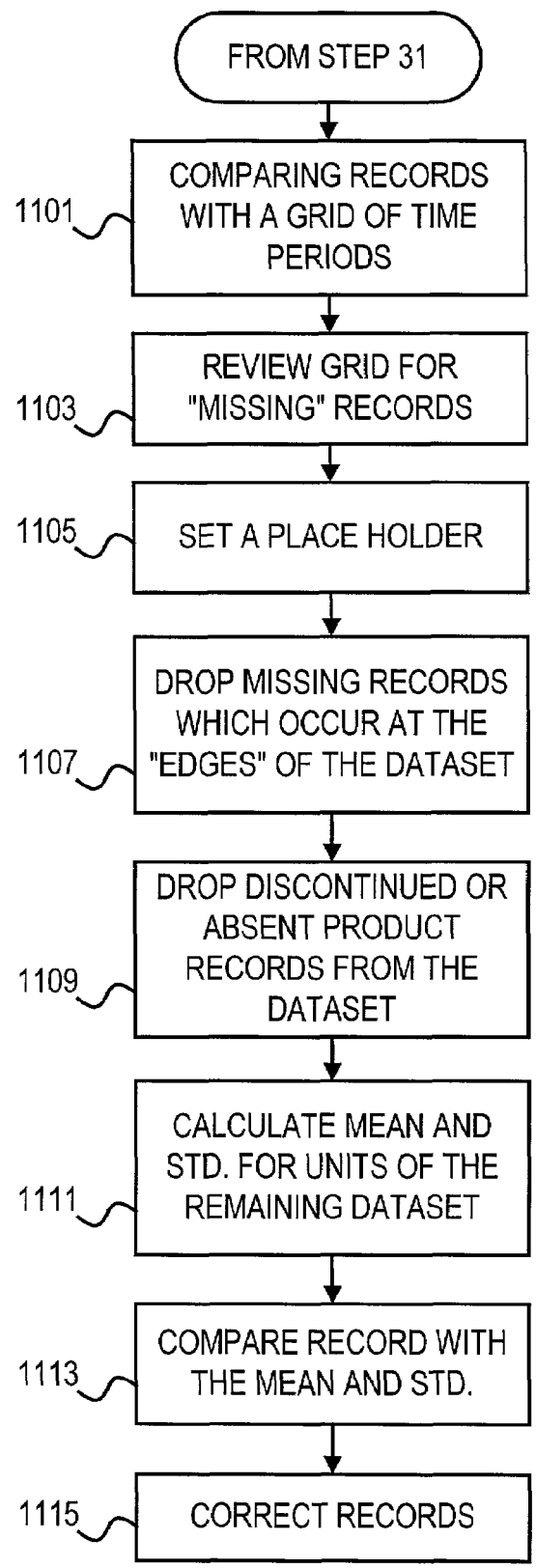
FIG. 2 is a flow chart depicting a process flow depicting a process by which partially cleansed econometric data is subject to further error detection and correction in accordance with a preferred embodiment of the present invention.

FIG. 2 depicts a process flow embodiment for determining the nature of missing data records in a fourth error detection and correction step in accordance with the principles of the present invention. The records are compared to a grid of time periods (Step 1101). The grid is reviewed for missing records with respect to a particular store and product (Step 1103). These missing records are then marked with a placeholder (Step 1105). Missing records at the "edges" of the dataset do not significantly affect the dataset and are deleted (Step 1107). Records for discontinued products or products recently introduced are dropped for those time periods where the product was not carried in the Store (Step 1109). The remaining dataset is processed to determine an average value for units (sold) and a STD for units (Step 1111). Each missing record is compared to the average units (Step 1113) and based on this comparison, a correction can be made (Step 1115).

Referring again to FIG. 2, in Step 1101, the data records are matched with a grid of time periods (shown here as weeks, but which can be any chosen time period). The grid can cover an entire modeled time interval, for example, as shown below, the six weeks 1/7–2/14 (shown here as weeks 1, 2, 3, 4, 5, and 6). Each product in each store (here store "Z") is gridded this way. For example:

| Grid | Date | Store | Product | Units | Price |
|------|------|-------|---------|-------|-------|
| 1 | 1/7 | Z | Y | 10 | 1.99 |
| 2 | 1/14 | Z | Y | 12 | 2.19 |
| 3 | | | | | |
| 4 | 1/28 | Z | Y | 8 | 1.99 |
| 5 | 2/7 | Z | Y | 10 | 1.99 |
| 6 | | | | | |

Review of the grid (Step 1103) shows that records are "missing" for dates 1/21 and 2/14 (i.e., grid 3 and grid 6). Placeholders are set in the records defined by grid 3 and grid 6 (Step 1105). For example, an easily detectable or arbitrarily large value can be put in the price column of the grid, e.g. 999. Alternatively, a simple X can be placed as a placeholder in the price column. In the present example, "X's" can be placed in the price columns of grid 3 and grid 6.

If the first or last grid in the dataset (here grid 1 or grid 6) has few or no observations, those records are deleted from the dataset (Step 1107). For purposes of the above analysis, a grid having "few" observations is defined as a grid having 50% fewer observations than is normal for the grids in the middle of the dataset. Here, for example, the record for grid 6 (the last week) is deleted because no records are present for that week. Also, using client-supplied stocking information, products which have been discontinued during the modeled time interval do not have their grids filled out for the discontinued time period (Step 1109). Also, products which are introduced during the modeled time interval have their time grid filled out only for those time periods occurring after the product introduction date. Thus, certain data aberrations are removed from the modeled dataset, permitting more accurate modeling.

The mean units (sold) and the STD for units are then calculated (Step 1111). For example, in dataset depicted above, the mean is 10 units. The missing record is then compared with the mean value (Step 1113). Here, a missing record (grid 3) is assigned an initial unit value=0. If the value of zero units lies within one (1) STD of the calculated mean, it is assumed that an actual value of zero units is feasible and that record is treated as if the record is valid (unit volume=0). However, if zero lies at greater than one STD from the mean, it is assumed that the value of zero units is due to a "stock-out". In such case, it is assumed that had product been present in the store an average number of units would have been sold. Therefore, the zero unit value for that record is replaced by a unit value equal to the calculated mean unit value, thereby correcting for the "stock-out". In this case, units for grid 3 will be corrected to calculated mean units (i.e., 10).

The product histories of the dataset can also be examined. If the subject product was introduced or discontinued as a salable item at the subject store during the modeled time interval, the grid is not filled out (with either zero or average values) for those time periods where the product was not offered for sale in the subject store. In this way missing records do not corrupt the dataset.

Further aspects of the fourth error detection and correction include a detection and elimination of outlying price data points (outliers). A satisfactory way of accomplishing this begins with a calculation of the mean price for each product within a given store, as determined over the modeled time interval. Once a mean price and STD are determined, all price data for the modeled time interval is examined. If it is determined that a price record lies within three (3) STD from the mean price it is deemed accurate and not an outlier. However, prices lying outside three (3) STD are treated as outliers. These outliers are assigned adjusted prices. The adjusted prices have the value of the immediately preceding time period (e.g., the previous day's or week's price for that product within the store). This adjusted price data is again checked for outliers (using the original mean and STD). Again, outliers are checked against the original mean and STD and again price adjusted if necessary. This usually removes all the remaining outliers. However, the process may optionally continue, iteratively, until there are no further outliers.

The net result of execution of the process Steps 1011–1031 disclosed hereinabove is the generation of a cleansed initial dataset which can be used for its own purpose or input into other econometric processes. One such process is the generation of imputed econometric variables.

Generation of Imputed Econometric Variables

The foregoing steps (1011–1031) concern cleansing the raw econometric data to create an error detected and error corrected ("cleansed") initial dataset. The cleansed initial dataset created in the foregoing steps can now be used to generate a variety of useful imputed econometric variables (Step 1033). These imputed econometric variables are useful in their own right and may also be output for use in further processing (Step 1035). One particularly useful application of the imputed econometric variables is that they can be input into an optimization engine which collects data input from a variety of sources and processes the data to provide very accurate economic modeling information. One example, of a suitable optimization engine is described in detail in the co-pending and concurrently filed patent application Ser. No. 09/741,958 entitled "Price Optimization System" filed on Dec. 20, 2000, the content of which was previously incorporated by reference herein.

Imputed Base Price

Figure 3A:
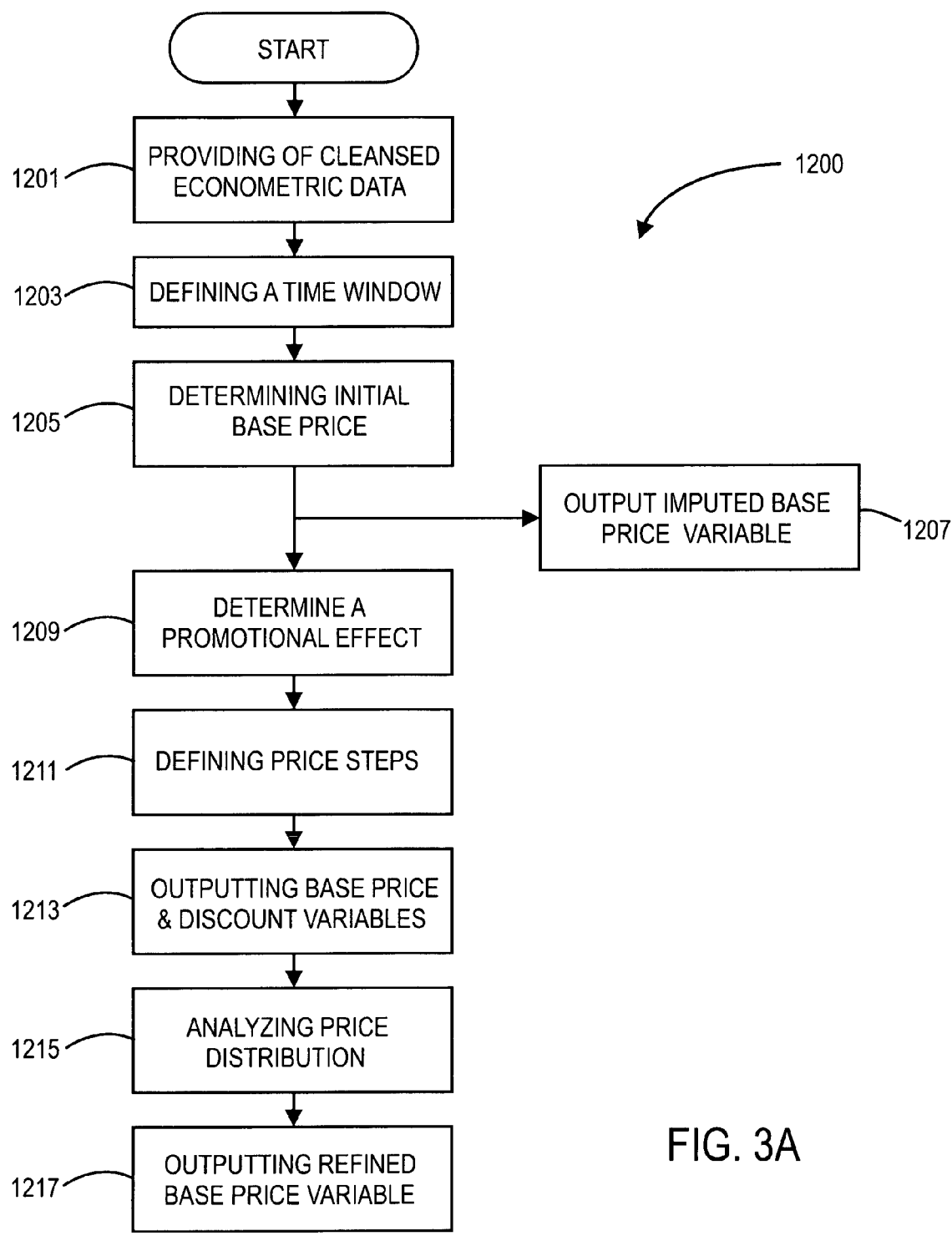
FIG. 3A is a flow chart depicting a process flow by which an imputed base price variable can be generated in accordance with one embodiment of the present invention.

One imputed econometric variable that can be determined using the initial dataset created in accordance with the forgoing, is an imputed base price variable (or base price). FIG. 3A is a flowchart 1200 outlining one embodiment for determining the imputed base price variable. The process begins by providing the process 1200 with a "cleansed" initial dataset (Step 1201), for example, the initial dataset created as described in Steps 1011–1031 of FIG. 1. The initial dataset is examined over a defined time window (Step 1203). Defining a time window (Step 1203) includes choosing an amount of time which frames a selected data point allowing one to look forward and backward in time from the selected data point which lies at the midpoint in the time window. This is done for each data point in the dataset, with the time window being defined for each selected data point. The time frame can be user selected or computer selected. The time window includes T time periods and the time period for the selected data point. One preferred set of T time periods is eight (8) weeks. It is contemplated that time windows of greater or lesser size can be selected. Referring to a preferred example, the selected (or current) data point is centered in the time window having T/2 time periods before the selected data point and T/2 time periods after the selected data point. In the present example, the time window includes the four weeks preceding the selected data point and the four weeks after the selected data point.

Figure 3B:
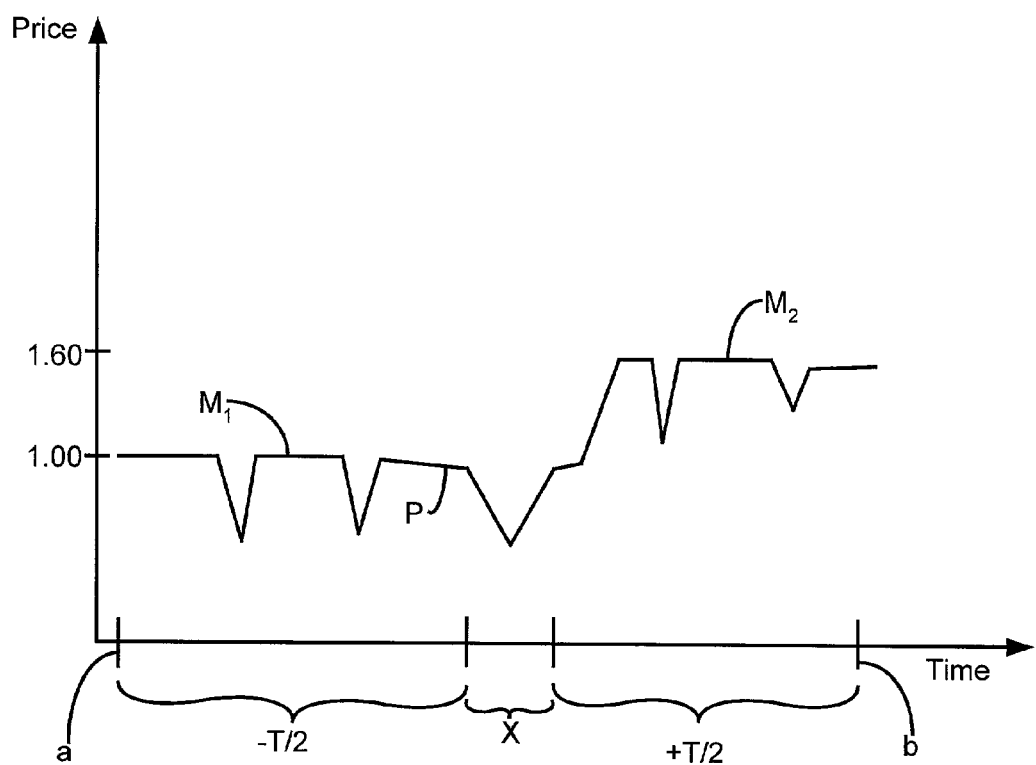
FIG. 3B is a price time diagram which illustrates an aspect of generating an imputed base price variable in accordance with one embodiment of the present invention.

Referring to FIG. 3B, the selected data point "X" (shown as a single week) is framed by a time period of –T/2 (shown here as 4 weeks) before the data point "X" and a time period of +T/2 (shown here as 4 weeks) after the data point "X". The time window comprising all the time (i.e., –T/2, X, T/2) between points a and b.

Referring again to FIG. 3A, once the time window is defined, an "initial base price" is determined (Step 1205). This can be accomplished by the following process. With reference to FIG. 3B, two price maxima are determined ($M_1$, $M_2$), one for each of the T/2 time periods before and after the current data point. The lesser value of the two maxima (here $M_1$) comprises the initial base price. The actual price (in selected data point "X") is compared with this initial base price (here, $M_1$). If initial base price is higher the actual price (as shown in the pictured example), then the "initial base price" is reset to reflect the price for the previous time period. In the pictured example, the lesser maxima $M_1$ is $1.00, the actual price during the data point "X" is less than $1.00 so the initial base price is reset to the price of the previous time period "P" (here $1.00).

Alternatively, the initial base price can be determined using other methods. For example, the average price of the product over the –T/2 time period (4 weeks) preceding the data point X may be used as the initial base price. Whatever method used, the initial base price is generated for each time period of the modeled time interval. One by one, each data point in the modeled time frame is examined and an initial base price is determined for each time period (e.g., "X") in the modeled time interval.

The initial base price values generated above provide satisfactory values for the imputed base price variable which may be output (Step 1207) and used for most purposes. However, optional Steps 1209–1217 describe an approach for generating a more refined imputed base price variable.

In generating a more refined imputed base price variable, the effect of promotional (or discount) pricing is addressed (Steps 1209–1217). This may be calculated by specifying a discount criteria (Step 1209); defining price steps (Step 1211); outputting an imputed base price variable and an imputed discount variable (Step 1213); analyzing the base price distribution (Step 1215); and outputting a refined base price variable (Step 1217).

Data records are evaluated over a series of time periods (e.g., weeks) and evaluated. The point is to identify price records which are discounted below a base price. By identifying these prices and not including them in a calculation of base price, the base price calculation will be more accurate. Therefore, a discount criterion is defined and input as a variable (Step 1209). A preferred criterion is 2%. Therefore, records having prices which are discounted 2% below the previously determined initial base price are treated as records having "promotional prices". These records are temporarily deleted from the dataset. The remaining records, having zero or small discounts, are treated as "non-promoted" records. So the price of each product for the "non-promoted" time periods (weeks) is averaged over all time periods (weeks) in the modeled time interval. The average non-promoted price is referred to as a base price.

Figure 3C:
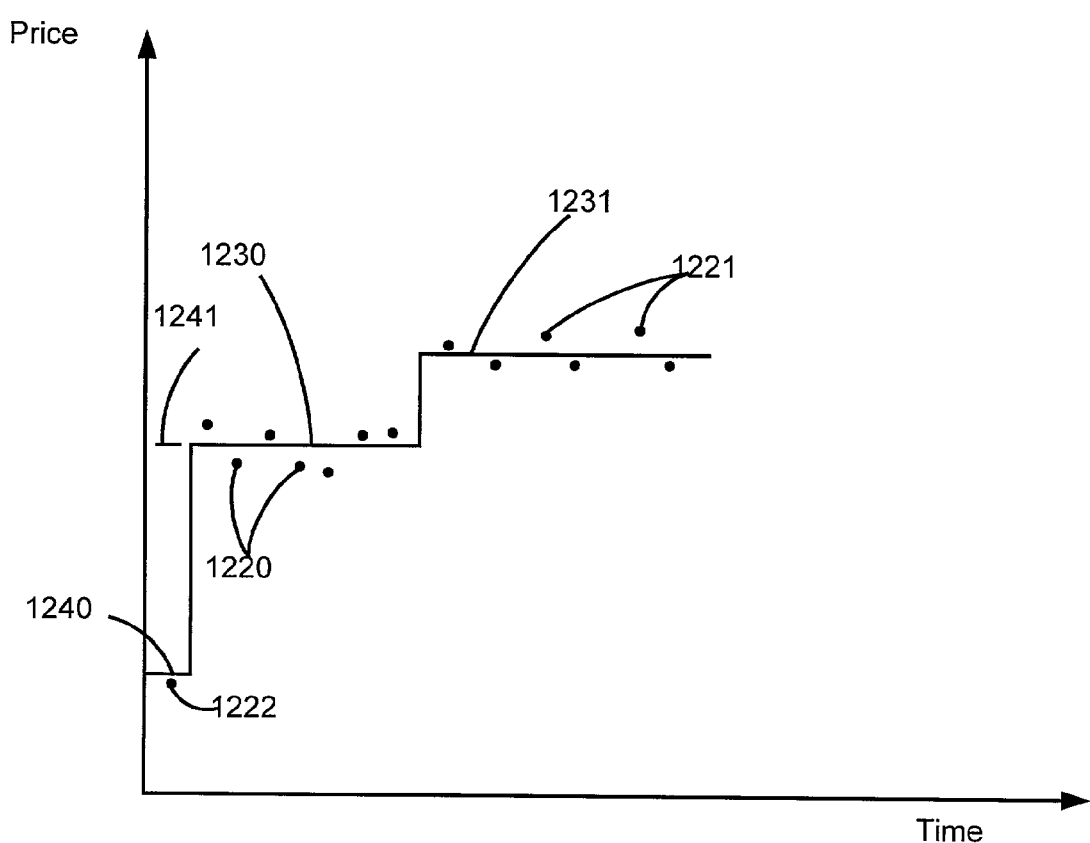
FIG. 3C is a price time diagram which illustrates an aspect of generating an imputed base price step function in accordance with one embodiment of the present invention.
Figure 3D:
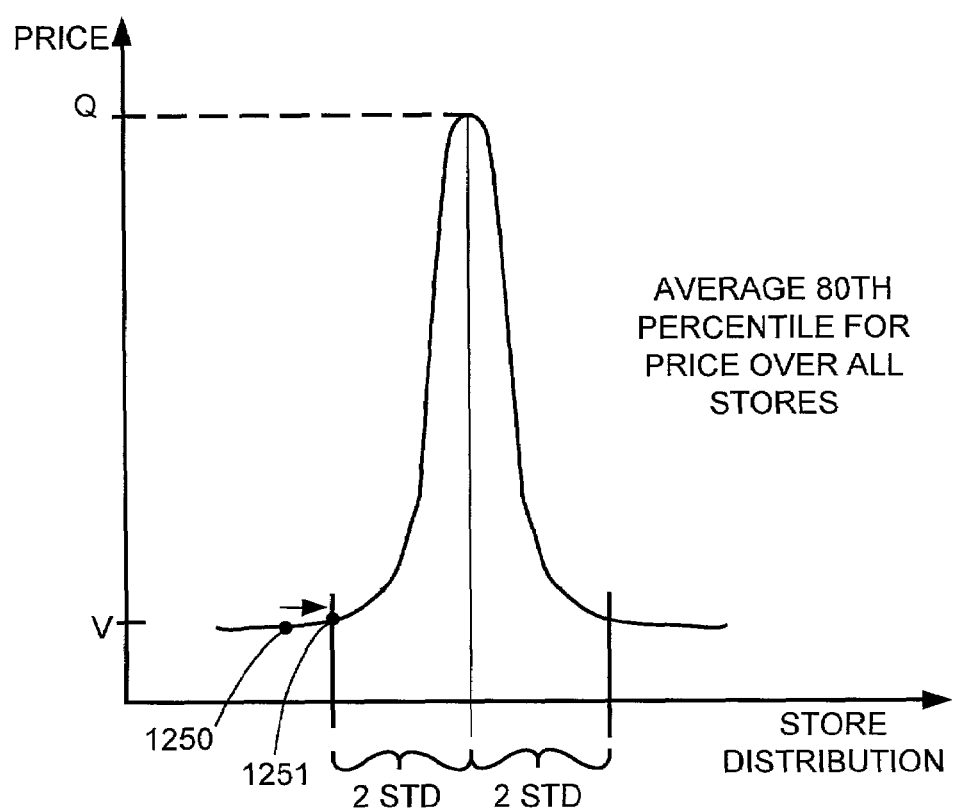
FIG. 3D is a diagram which illustrates a plot of average $80^{th}$ percentile of price for all stores used in correcting data inconsistencies during base price imputation in accordance with one embodiment of the present invention.

Further analysis is used to define base price "steps" (Step 1211). This process can be more readily illustrated with references to FIG. 3C which shows a distribution of base price data points 1220, 1221, 1222 and their relationship to a projected step function 1230, 1231, 1240, 1241 plotted on a graph of price over time. Base price data points 1220, 1221, 1222 are evaluated. Steps 1230, 1231 are roughly defined such that the base price data points 1220, 1221 lie within a small percent of distance from the step 1230, 1231 to which they are associated (e.g., 2%). This can be accomplished using, for example, a simple regression analysis such as is known to those having ordinary skill in the art. By defining the steps 1230, 1231, the average value for base price over the step is determined. For example, price data points 1220 are averaged to determine the base price of step 1230. Also, price data points 1221 are averaged to determine the base price of step 1231. Thus, the average of the base prices in a step is treated as the refined base price for that step.

Further refining includes an analysis of the first step 1240. If the first step 1240 is short (along the time axis) and considerably lower than the next step 1230, it is assumed that the first step 1240 is based on a discounted price point 1222. As such, the value of the next step 1230 is treated as the base price for the time period of the first step 1241 (represented by the dashed line).

At this point, absolute discount (ΔP) and base price (BP) are used to calculate percent discount (ΔP/BP) for each store product time period. Percent discounts that are less than some value (e.g. 1%) are treated as being no discount and corrected to ΔP/BP=0. The above determined base price variable and percent discount variable are then output (Step 1213).

This base price is subjected to further analysis for accuracy using cross-store checking (Step 1215). This can be accomplished by analyzing the base price data for each product within a given store. A curve is generated for each product. This curve defines the price distribution for each product. The 80$^{th}$ percentile for base price is then calculated for the analyzed product (i.e., the base price point below which 80% of the analyzed product (over the modeled time interval) is priced). This is referred to as the "in store 80$^{th}$ percentile" for that product. A calculation is then made of the average 80$^{th}$ percentile for price of the analyzed product across all stores (the cross-store 80$^{th}$ percentile). Each store's prices are then merged with each other store to calculate the average 80$^{th}$ percentile for base price over all stores.

The stores are then analyzed product by product. If the base price for a store is greater than two (2) standard deviations from the cross-store average 80$^{th}$ percentile for base price and if the in-store 80$^{th}$ store percentile is more than 50% different from the cross-store 80$^{th}$ percentile, this store is flagged as an outlier for the analyzed product.

| Store | Product | In Store 80$^{th}$ % | Cross-Store 80$^{th}$ % | Flagged |
|---|---|---|---|---|
| Y | A | 1.99 | 1.99 | No |
| Y | B | 2.09 | 1.99 | No |
| Y | C | 0.29 | 1.99 | Yes |
| Y | D | 1.89 | 1.99 | No |

The outlier store's base price is adjusted for the analyzed product such that it lies only two (2) standard deviations away from the average cross-store 80$^{th}$ percentile for base price over all stores. This is illustrated in FIG. 12D. The average 80$^{th}$ percentile price over all stores is shown as "Q". If a flagged store has a base price for an analyzed product beyond two (2) STD from the mean, as shown by data point 1250, that data point is corrected by moving the data point to the "edge" at two (2) STD (as shown by the arrow) from the mean. That point 1251 is shown having a new base price of V.

Thus, the forgoing process illustrates an embodiment for determining an imputed base price variable.

Imputed Relative Price Variable

Figure 4:
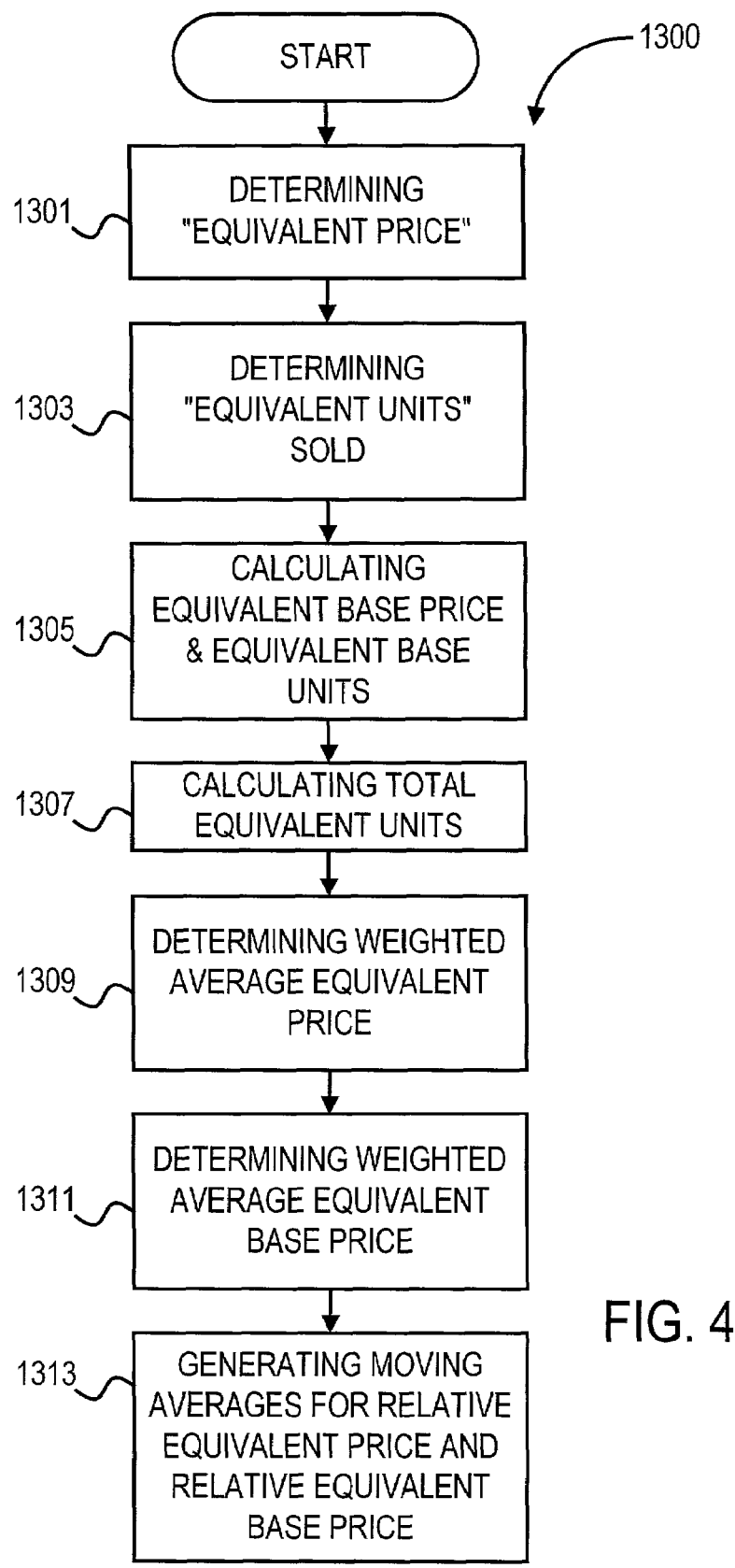
FIG. 4 is a flow chart depicting a process flow by which an imputed relative price variable can be generated in accordance with one embodiment of the present invention.

Reference is now made to the flowchart 1300 of FIG. 4 which illustrates an embodiment for generating relative price variables in accordance with the principles of the present invention. In the pictured embodiment, the process begins with a calculation of an "equivalent price" for each product sold for each store (Step 1301). The following example will use soda to illustrate an aspect of the present invention. An example dataset is shown below:

| Product | Size | Equivalent Factor | Actual Price | Units | Equivalent Units | Equivalent Price |
|---|---|---|---|---|---|---|
| A | 8 | 16 | 1.00 | 500 | 250 | 2.00 |
| B | 16 | 16 | 2.00 | 300 | 300 | 2.00 |
| C | 32 | 16 | 3.00 | 100 | 200 | 1.50 |

Using this data, relative price may be calculated. As disclosed earlier, an equivalizing factor is defined. For this example, let the equivalizing factor be 16. Using the equivalizing factor, an equivalent price can be calculated (Step 1301).

$$\text{Equivalent Price} = \text{Actual Price} \cdot \left(\frac{Equivalizing factor}{size}\right)$$

Thus for $$A: \text{Equivalent Price} = \$1.00 \left(\frac{16}{8}\right) = \$2.00$$

$$B: \$2.00 \left(\frac{16}{16}\right) = \$2.00$$

$$C: \$3.00 \left(\frac{16}{32}\right) = \$1.50$$

the results of these calculations are shown in the "Equivalent Price" column of the table above.

Next equivalent units sold ("units") can be calculated (Step 1303).

$$\text{Equivalent Units} = \text{units} \cdot \left(\frac{size}{equivalizing factor}\right)$$

Thus for $$A: \text{Equivalent Units} = 500\left(\frac{8}{16}\right) = 250$$

In a similar vein, equivalent base price and equivalent base units are calculated (Step 1305) using the imputed values for base price (for example, as determined in Steps 1201–1207) and for base units (also referred to as base volume which is determined as disclosed below).

For each Store, each demand group, and each date, the total equivalent units is determined (Step 1307). For example, using the dataset above (assuming that the data is from the same store), a total of 750 (i.e., 250+300+200) equivalent units were sold.

Defining A, B, and C as products in a demand group, the equivalent values for the demand group are depicted below:

| Product | Equivalent Units | Equivalent Price |
|---|---|---|
| A | 250 | $2.00 |
| B | 300 | $2.00 |
| C | 200 | $1.50 |

A weighted calculation of relative equivalent price is then made (Step 1309). For example, such relative price value is determined as follows:

Equivalent price is divided by a weighted denominator.

The weighted denominator is calculated by multiplying equivalent units for each product times the equivalent units sold. For each product, only the values of other products are used in the calculation. This means excluding the product being analyzed. For example, if products A, B, and C are being analyzed in turn, when product A is analyzed the value for A is excluded from the denominator. Using the above data, the relative price of A is determined as follows:

$$rel_A = \frac{equiv.\,price\,of A}{\left[\frac{(equiv.units of B)(Equiv.price of B)\,+}{total equivalent units - equivalent units of A}\right]}$$

$$= \frac{2}{\left[\frac{(300)(200) + (200)(1.50)}{(250 + 300 + 200) - 250}\right]}$$

$$= 1.111$$

$$rel_B = \frac{2}{\left[\frac{(250)(2.00) + (200)(1.50)}{750 - 300}\right]}$$

$$= 1.125$$

$$rel_C = \frac{1.50}{\left[\frac{(250)(2.00) + (300)(2.00)}{750 - 200}\right]}$$

$$= 0.75$$

To insure that all members of a demand group are counted at least at some minimal level, if equivalent units =0, a value of "1" is added to all units. In an example where equivalent units were A=0; B=5; C=11, the units would be revalued as A=1; B=6; C=12, and the calculations as disclosed above would be conducted. Also, where the number of products in a demand group is equal to one, the weighted average equivalent price for the single product is equal to the equivalent price for that product. If a value for equivalent price is missing, the equivalent price for the previous record is used for equivalent price.

Also, a weighted average equivalent base price is calculated using the method disclosed hereinabove. The only difference being that instead of using the actual equivalent price, the calculated base price values per equivalent are used (Step 1311). Using the previously disclosed techniques, a moving average is generated for relative actual equivalent price and relative equivalent base price (Step 1313).

This moving average is generally calculated by first defining a time period window framing each analyzed date (e.g., four weeks, two weeks prior, two weeks after). This framing time period is specified as an input. Second, for each date in the time period window, a weighted average of actual equivalent price and a weighted average of equivalent base price are calculated. For time period windows where there are insufficient days preceding the analyzed date (e.g., if the time window requires two week's worth of data but only one week is available), imputed values are provided for base price or actual price. Such imputed values are just the average value for base price or actual price, respectively. Third, once the time period window is defined, calculations are made defining average relative actual equivalent price and average relative equivalent base price over the time period window, thereby defining a moving average for both relative actual equivalent price and relative equivalent base price. This, is repeatedly done with the window being moved incrementally through the dataset thereby obtaining a moving average.

Thus a variety of imputed relative price variables can be generated (e.g., relative equivalent price, relative equivalent base price. etc.).

Imputed Base Volume Variable

Figure 5A:
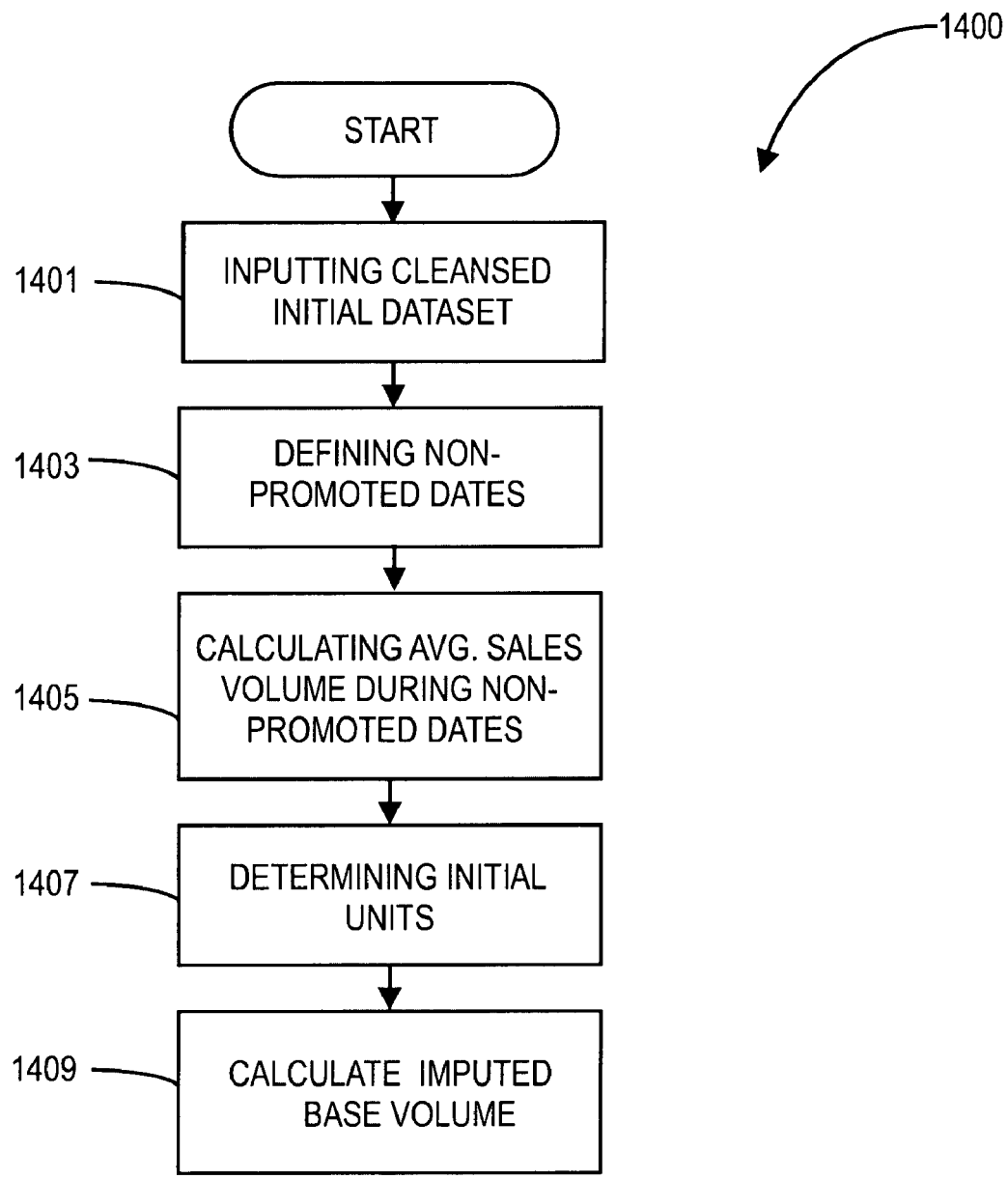
FIG. 5A is a flow chart depicting a process flow by which an imputed base unit sales volume variable can be generated in accordance with one embodiment of the present invention.

A flowchart 1400 shown in FIG. 5A illustrates one embodiment for generating an imputed base volume variable. Base volume refers to the volume of product units sold in the absence of discount pricing or other promotional effects. Base volume is also referred to herein as simply "base units". The determination of base volume begins by receiving the cleansed initial dataset information for each product and store (Step 1401). The initial dataset information is processed to determine "non-promoted dates" (Step 1403). For example, using the percent discount (ΔP/BP) information generated above, product records having a percent price discount that is less than some predetermined discount level (e.g., 2%) are treated as non-promoted products for the time periods where the percent discount is less than the predetermined discount level (e.g., 2%). These records are used to generate a data subset defining the dates where the products are not significantly price discounted i.e., "non-promoted dates". This data subset is also referred to herein as the non-promoted data subset.

Using the non-promoted data subset, an average value for "units" and a STD is calculated (i.e., an average value for product unit sales volume for each product during the non-promoted dates is calculated) (Step 1405). The average units are rounded up to the nearest integer value, this value shall be referred to as the "non-promoted average units".

An initial value for base units ("initial base units") is now determined (1407). This value is determined for all dates in the dataset, not just the non-promoted dates. For those records having a percent price discount that is less than the predetermined discount level (e.g., 2%) the actual units sold are treated as "initial base units". However, where such records (those the 2% or less discount) also have an actual value for units sold which is greater than 1.5 STD from the non-promoted average unit value (as calculated above), then the actual value for units sold is not used. Instead, it is replaced with the non-promoted average unit value in calculating "initial base units". For the other records (those having a percent price discount that is equal to or greater than the predetermined discount level (e.g., 2%)), the previously calculated non-promoted average unit value is used for "initial base units".

Figure 5B:
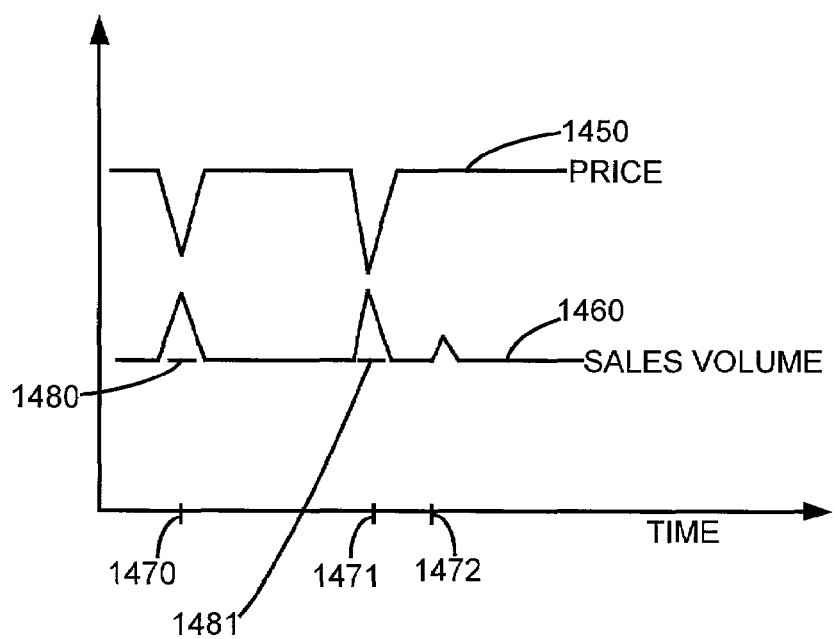
FIG. 5B is a diagram used to illustrate the comparative effects of sales volume increase and price discounts.

This principle can be more readily understood with reference to FIG. 5B. The price behavior 1450 can be compared with sales behavior 1460. Typically, when the price drops below a certain level, sales volume increases. This can be seen at time periods 1470, 1471. This can be reflective of, for example, a 2% or greater price discount. This is to be expected, and as a result, these sales records should not affect calculations of "base volume". In such a case, the actual units sold (more than usual) are not included in a base volume determination. Rather, those records are replaced with the average volume value for the non-promoted dates (the non-promoted average unit value, shown with the dotted lines 1480, 1481). However, where a sales volume increases during a period of negligible discount (e.g., less than 2%), such as shown for time period 1472, the actual units sold (actual sales volume) are used in the calculation of base volume. However, if the records show a sales volume increase 1472 which is too large (e.g., greater than 1.5 standard deviations from the non-promoted average unit value), it is assumed that some other factor besides price is influencing unit volume and the actual unit value is not used for initial base units but is replaced by the non-promoted average unit value.

A calculated base volume value is now determined (Step 1409). This is accomplished by defining a time window. One preferred window is four (4) weeks, but the time window may be larger or smaller. For each store and product, the average value of "initial base units" is calculated for each time window. This value is referred to as "average base units". This value is calculated for a series of time windows to generate a moving average of "average base units". This moving average of the average base units over the modeled time interval is defined as the "base volume variable".

Supplementary Error Detection and Correction

Figure 6A:
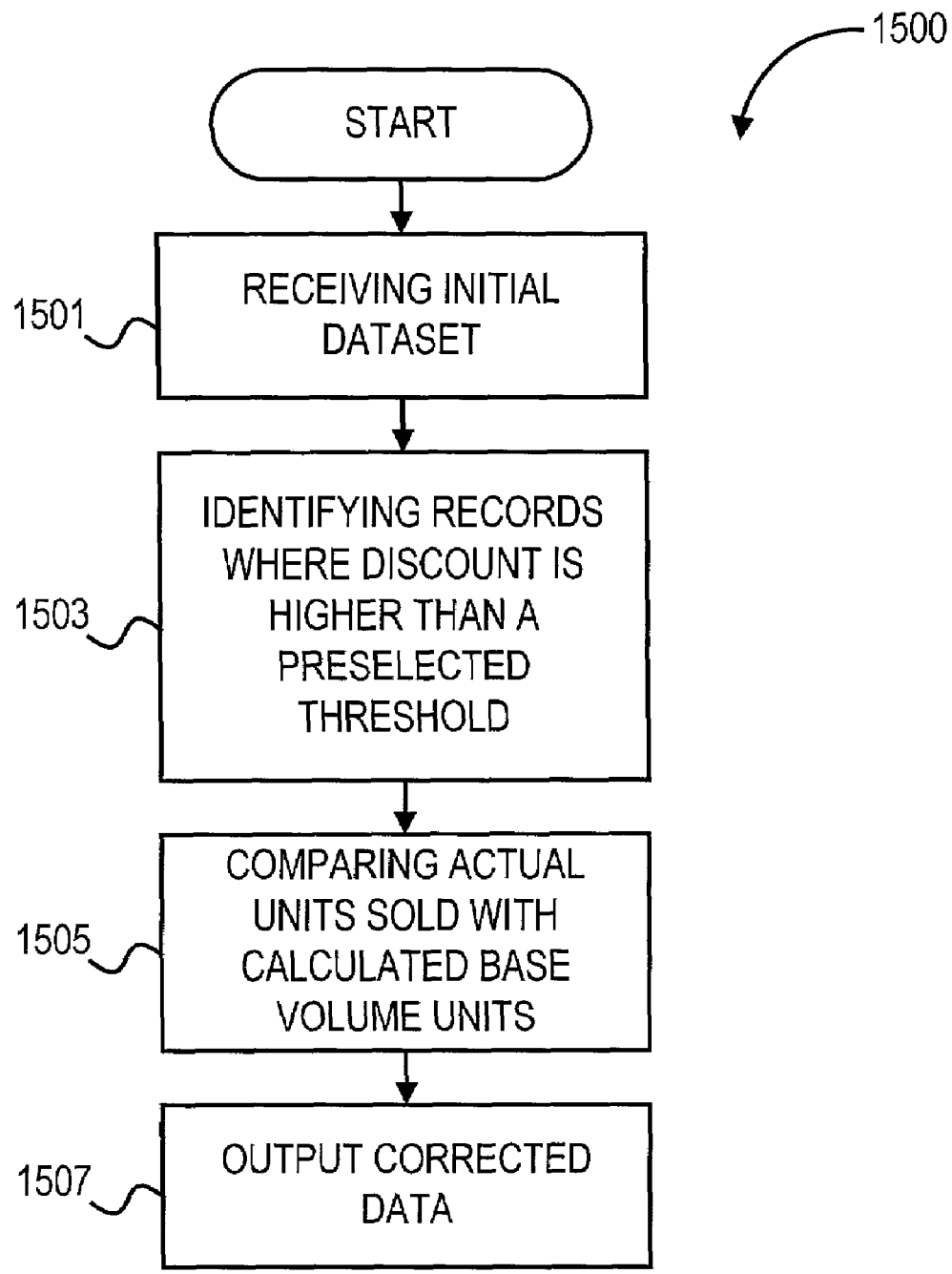
FIG. 6A is a flow chart depicting a process flow by which supplementary error detection and correction in accordance with an embodiment of the present invention.

Based on previously determined discount information, supplementary error detection and correction may be used to correct price outliers. A flowchart 1500 illustrated in FIG. 6A shows one embodiment for accomplishing such supplementary error detection and correction. Such correction begins by receiving the cleaned initial dataset information for each product and store (Step 1501). In addition the previously calculated discount information is also input, or alternatively, the discount information (e.g., □P/BP) can be calculated as needed. The initial dataset and discount information is processed to identify discounts higher than a preselected threshold (e.g., 60% discount) (Step 1503). For those time periods (e.g., weeks) having price discounts higher than the preselected threshold (e.g., greater than 60%), a comparison of actual units sold to calculated base volume units (as calculated above) is made (Step 1505).

Figure 6B:
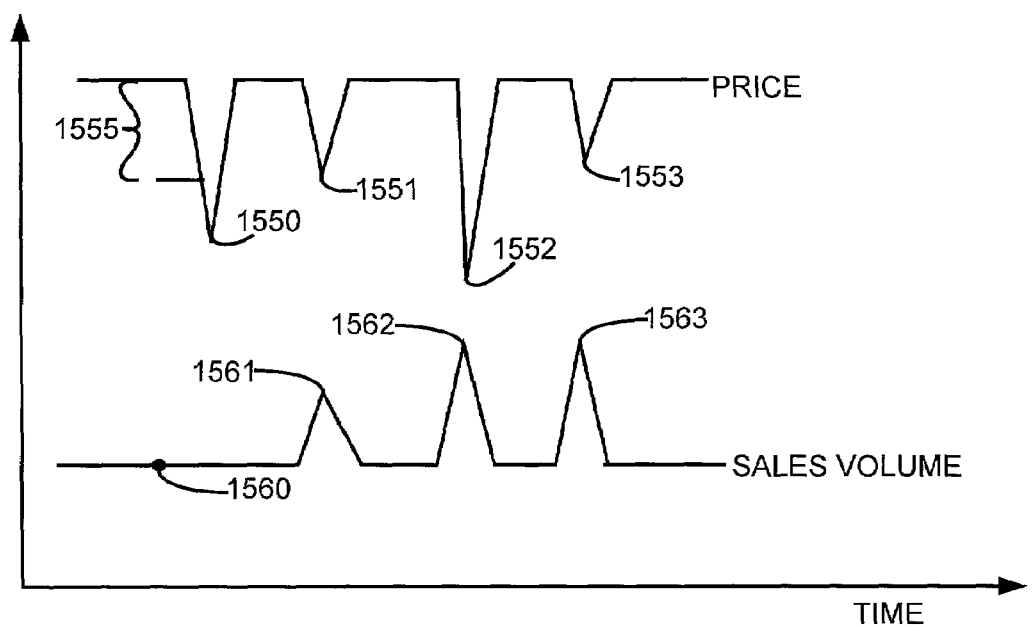
FIG. 6B is a diagram used to illustrate the comparative effects of sales volume increase and price discounts.

The concepts are similar to that illustrated in FIG. 5B and may be more easily illustrated with reference to FIG. 6B. The principles of this aspect of the present invention are directed toward finding unexplained price aberrations. For example, referring to FIG. 6B, price discounts are depicted at data points 1550, 1551, 1552, and 1553. Also, corresponding sales increases are depicted by at data points 1561, 1562, and 1563. The data point 1550 has a discount greater than the threshold 1555 (e.g., 60%). So an analysis is made of data point 1550.

If the number of actual units sold (shown as 1560) lies within two (2) STD of the calculated base volume, then it is assumed that the actual price 1550 is actually an erroneous record and the actual value 1550 is replaced with the calculated base price.

However, if the number of actual units sold is greater than two (2) STD from the calculated base volume, it is assumed that the volume number is correct and the price is reset to reflect a discount of 60% and the price is recalculated based on the 60% discount. In short, the discount is capped at the chosen value (here 60%). Once the data is corrected, it can be output (step 1507).

Figure 7:
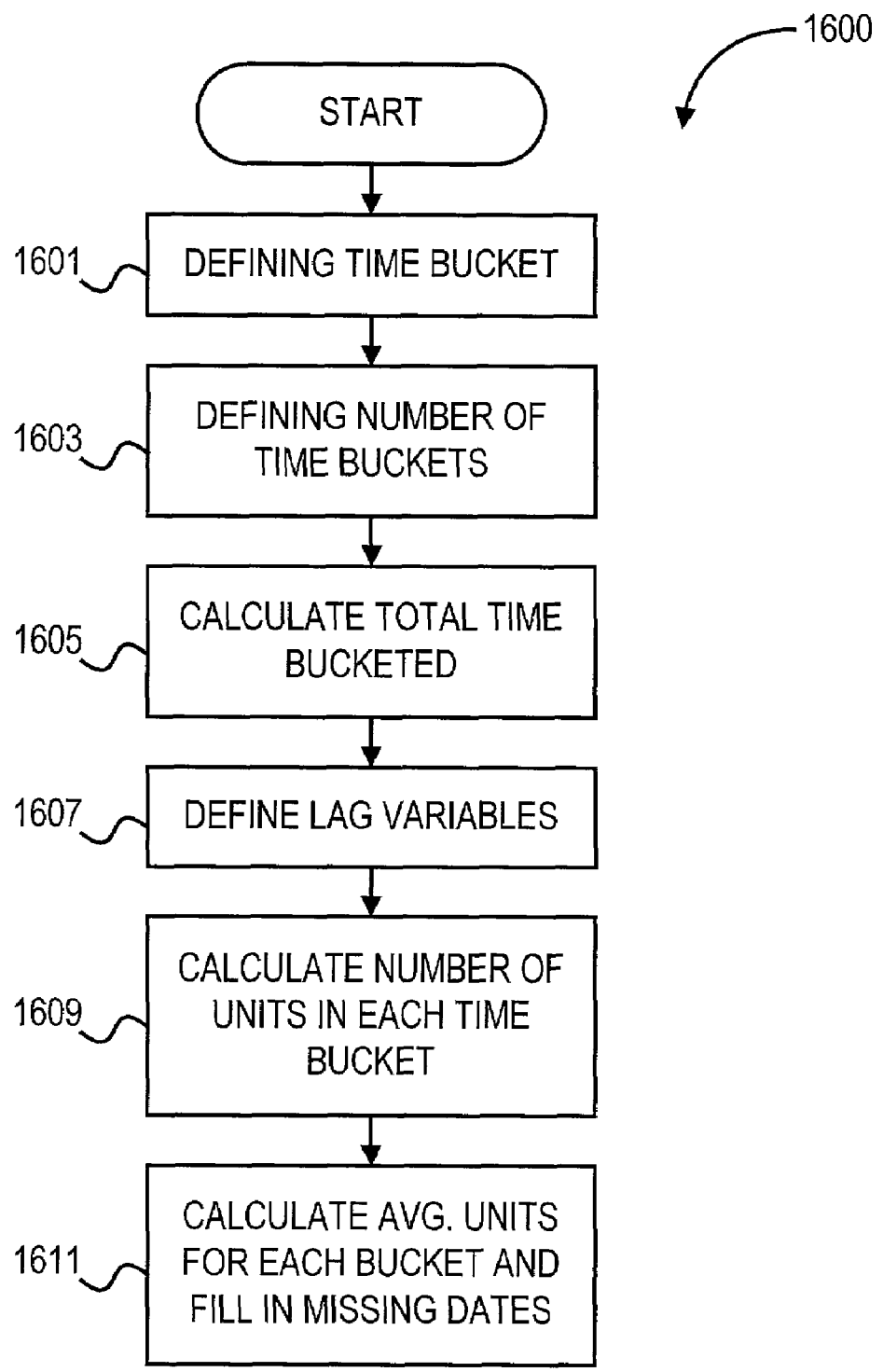
FIG. 7 is a flow chart depicting a process flow by which an imputed stockpiling variable can be generated in accordance with an embodiment of the present invention.

Determining Imputed Variables which Correct for the Effect of Consumer Stockpiling With reference to FIG. 7, a flowchart 1600 illustrating a method embodiment for generating stockpiling variables is depicted. The purpose of the stockpiling variables is to model unit sales volume as a function of time to detect consumer stockpiling behavior. The pictured embodiment 1600 begins by defining the size of a "time bucket"(m), for example, the size (m) of the bucket can be measured in days (Step 1601). A preferred embodiment uses a bucket of one (1) week or seven (7) days. Additionally, the number ($\tau$) of time buckets to be used is also defined (Step 1603). The total amount of time "bucketed" (m X $\tau$) is calculated (Step 1605).

"Lag" variables which define the number of product units sold ("units") in the time leading up to the analyzed date are defined (Step 1607). For example:

Lag1(units)=number of product units sold in one (1) time period (e.g., a day or week) before the analyzed date;

Lag2(units)=number of product units sold in two (2) time periods (e.g., a day or week) before the analyzed date;

.
.
.

Lagt(units)=number of product units sold in t time periods (e.g., a day or week) before the analyzed date.

Then the total number of product units sold is calculated for each defined time bucket (Step 1609). For example:

Bucket1=sum of units sold during the previous m days;

Bucket2=sum of units sold from between the previous m+1 days to 2m days;

Bucket3=sum of units sold from between the previous 2 m+1 days to 3m days;

.
.
.

Bucket($\tau$)=sum of units from between the previous ($\tau$−1) m+1 days to ($\tau$)m days.

Correction can be made at the "front end" of the modeled time interval. For example, the data can be viewed as follows:

|  | Week 1 | Week 2 | Week 3 | Week 4 | Week 5 | Week 6 | Week 7 |
| --- | --- | --- | --- | --- | --- | --- | --- |
| Bucket 1 | — | Week 1 | Week 2 | Week 3 | Week 4 | Week 5 | Week 6 |
| Bucket 2 | — | — | Week 1 | Week 2 | Week 3 | Week 4 | Week 5 |
| Bucket 3 | — | — | — | Week 1 | Week 2 | Week 3 | Week 4 |
| Bucket 4 | — | — | — | — | Week 1 | Week 2 | Week 3 |

If working near the front end of a dataset, units from previous weeks cannot always be defined and in their place an averaged value for bucket sum can be used (Step 1611). For example, referring to Bucket 1, there is no Bucket 1 data for Week 1. As a result, the Bucket 1 data for weeks 2–7 are averaged and that value is put into Week 1 of Bucket 1. Similarly, with reference to Bucket 2, Week 1 and Week 2 are missing a value for Bucket 2, Weeks 1–3 are missing a value for Bucket 3, and Weeks 1–4 are missing a value for Bucket 4. The average values are generated for the missing values from weeks. For example, for Bucket 2, an average value for Weeks 3–7 is generated. This average value is used to fill out the missing dates of Bucket 2 (Weeks 1–2). Similarly, for Bucket 3, the average value for Weeks 4–7 are averaged and used to fill out the missing dates (Weeks 1–3). The same principle applies to Bucket 4. These Buckets define variables which are used to model the impact of promotional activity in previous time periods. The Buckets are used as variables in models which can be used to determine if there is a relationship between sales volume between a previous time as compared with a current time.

The stockpiling variables are used to detect and integrate the effects of consumer stockpiling into a predictive sales model.

Day of the Week Analysis

Figure 8:
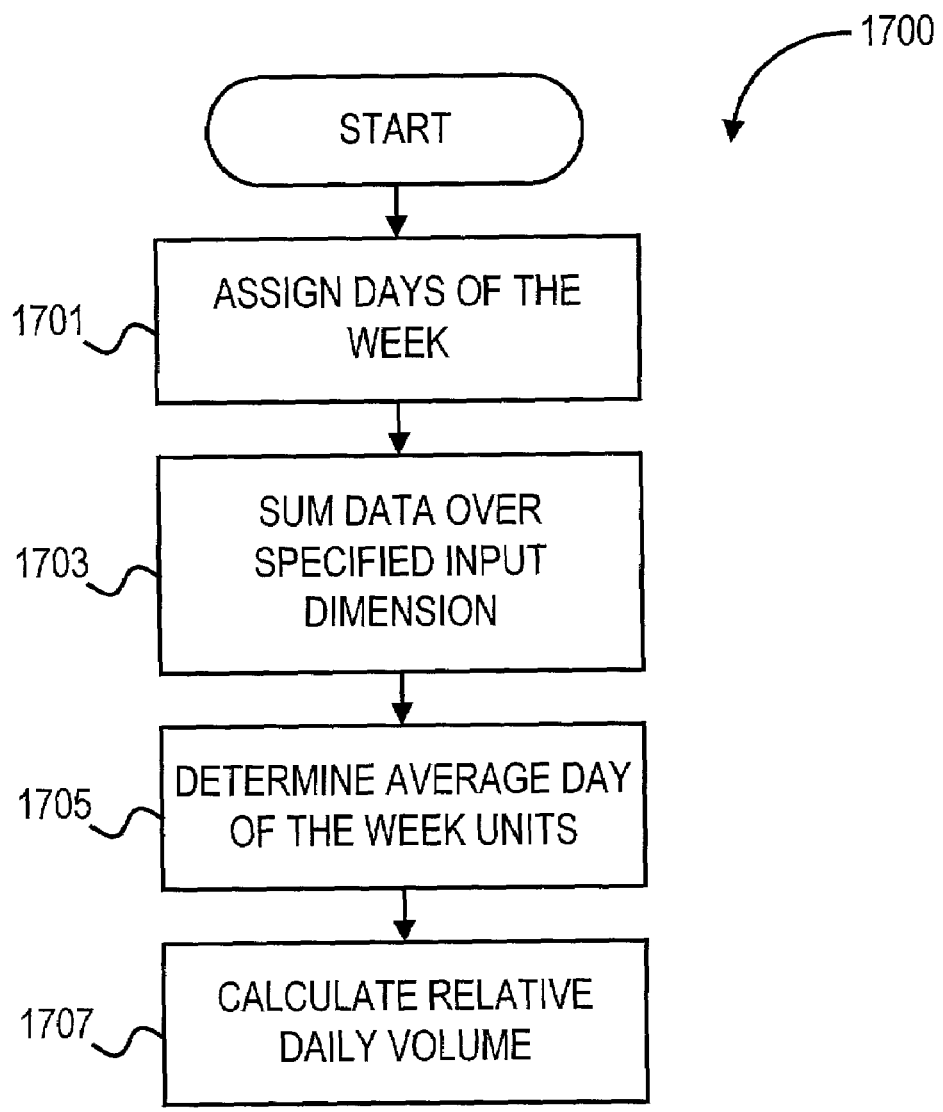
FIG. 8 is a flow chart depicting a process flow by which an imputed day-of-week variable can be generated in accordance with an embodiment of the present invention.

With reference to FIG. 8, a flowchart 1700 illustrating one embodiment for determining a Day of the Week variable is shown. Such variables are used to identify and predict sales behavior based on the day of the week. It is necessary to have data on a daily basis for a determination of Day of the Week effects. In accordance with the principles of the present invention the embodiment begins by assigning the days of the week numerical values (Step 1701). A first date in the dataset is assigned. This can be arbitrarily assigned, but typically the first date for which data is available is selected as the "first date". This date is assigned Day of Week="1". The next six days are sequentially assigned Days of the Week=2,3,4,5,6,7, respectively. This process continues with the next consecutive days data starting over again with Day of Week="1", continuing throughout all the days of the modeled time interval.

Once categorized by day of the week the product units (sold) are summed for a specified dimension or set of dimensions. Dimension as used herein means a specified input variable including, but not limited to, Product, Brand, Demand Group, Store, Region, Store Format, and other input variable which may yield useful information (Step 1703). For example, if Region is the specified dimension (e.g., all the stores in Los Angeles, Calif.), all of the unit volume for selected products in the Los Angeles stores is summed for each Day of Week (i.e., 1,2,3,4,5,6, and 7).

For each Day of Week and each dimension specified, the average units (sold) are determined (Step 1705). For each date, a "relative daily volume" variable is also determined (Step 1707). For example, relative daily volume for a given Store is provided by (total Store daily units)/(average Store daily units). Such calculation can be accomplished for any input variable.

One numeric example can be shown as follows. A store sells 700 units of X over a given modeled time interval. Average daily units=700/7=100. If sales for all of the Friday's of the modeled time interval amount to 150 units, it can be shown that, for that Store, Friday's relative daily volume is 1.5, i.e., more than average. This information may prove valuable to a client merchant and can comprise an input variable for other econometric models.

Imputed Seasonality Variable Generation

Another useful imputed variable is an imputed seasonality variable which is used to determine sales volume as a function of the time of year. One preferred approach for generating this variable is in accordance with the method described by Robert Blattberg and Scott Neslin in their book "Sales Promotion: Concepts, Methods, and Strategies", at pages 237–250 (Prentice Hall, N.J., 1990).

Figure 9:
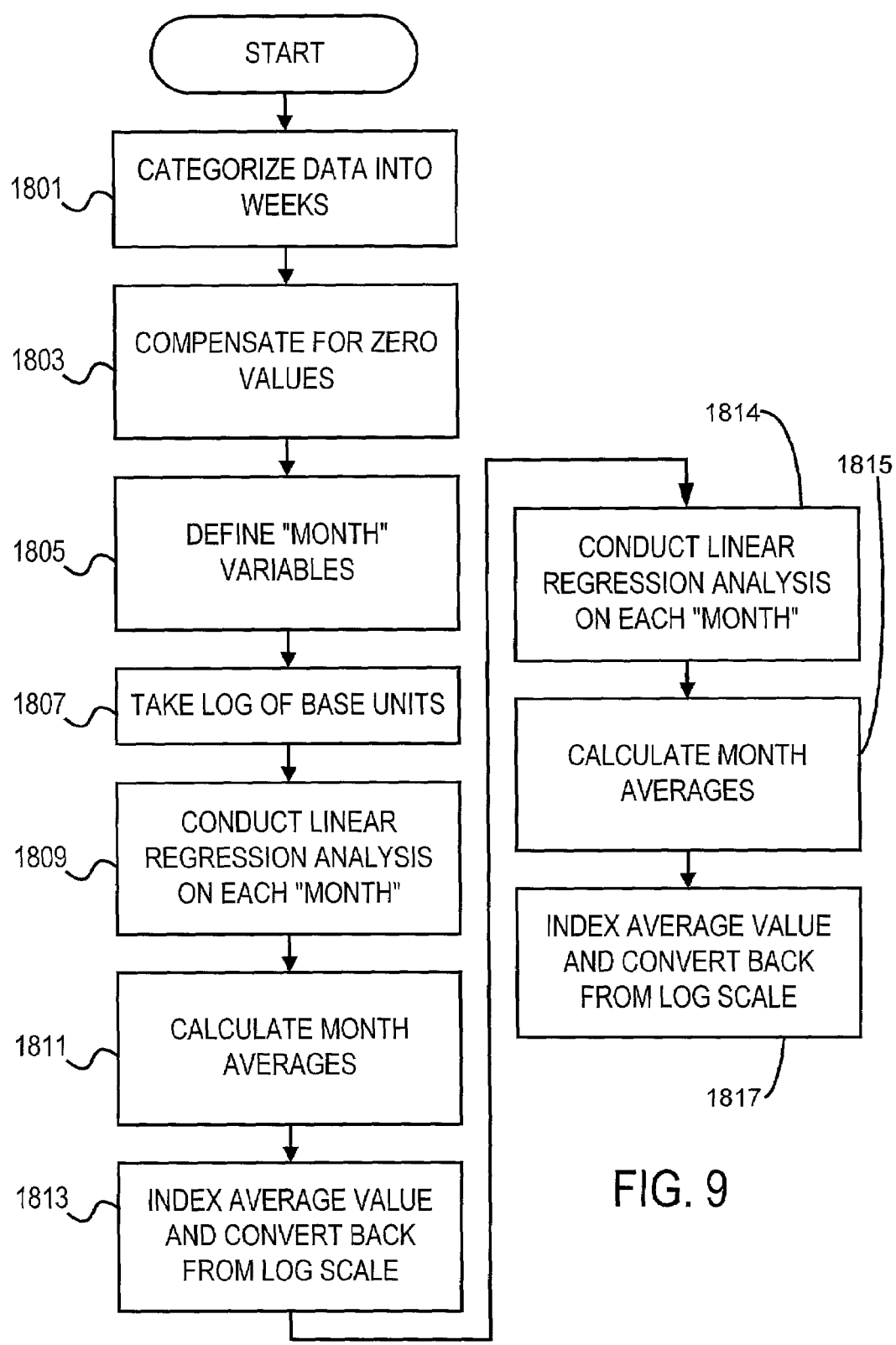
FIG. 9 is a flow chart depicting a process flow by which an imputed seasonality variable can be generated in accordance with an embodiment of the present invention.

Referring to FIG. 9, a flowchart 1800 illustrating one embodiment in accordance with the present invention for determining an imputed seasonality variable is shown. The process begins with categorizing the data into weekly data records, if necessary (Step 1801). Zero values and missing records are then compensated for (Step 1803). "Month" variables are then defined (Step 1805). A logarithm of base units is then taken (Step 1807). Linear regressions are performed on each "Month" (Step 1809). "Months" are averaged over a specified dimension (Step 1811). Indexes are averaged and converted back from log scale to original scale (Step 1813). The average of normalized estimates are calculated and used as Seasonality index (Step 1815). Individual holidays are estimated and exported as imputed seasonality variables (Step 1817).

The embodiment begins by categorizing the data into weekly data records. Chiefly, this comprises aggregating daily data into weekly groups (Step 1801). For missing sales records or records having zero volume values, insert average volume data (Step 1803).

A set of month variables is first defined (Step 1805). A series of models of base units are constructed using each defined month variable as the predictor.

The process of defining month variables is as follows:
1) Define the month variable
   a. Starting with Week 1, Day 1, assign a month number to each week (Month1)
   b. Assume 4 weeks per month
   c. Depending on the time frame of the dataset, there may be 12 or 13 months defined
2) Repeat definition of month variable three more times
   a. Advance Week 1 to the second week in the dataset
   b. Assign a month number to each week (Month2)
   c. Advance Week 1 to the third week in the dataset
   d. Assign a month number to each week (Month3)
   e. Advance Week 1 to the fourth week in the dataset
   f. Assign a month number to each week (Month4)

| Week | Month1 | Month2 | Month3 | Month4 |
|------|--------|--------|--------|--------|
| 1 | 1 | 12 | 12 | 12 |
| 2 | 1 | 1 | 12 | 12 |
| 3 | 1 | 1 | 1 | 12 |
| 4 | 1 | 1 | 1 | 1 |
| 5 | 2 | 1 | 1 | 1 |
| 6 | 2 | 2 | 1 | 1 |
| 7 | 2 | 2 | 2 | 1 |
| 8 | 2 | 2 | 2 | 2 |
| ... | ... | ... | ... | ... |

The values determined for base units are now processed. By taking the log of base units the effect of extreme variations in base units can be reduced (Step 1807). A linear regression is run on the log of base units for Month 1 (Step 1809). The regression models the log of base units as a function of Month 1 levels and Week number: (log(base units)=f(Month1, Week number)). The regression analysis is repeated using months Month2, Month3, and Month4 to determine, respectively log(base units)=f(Month2, Week number); log(base units)=f(Month3, Week number); and log(base units)=f(Month4, Week number).

3) The average value across the 12 (or 13) levels of the Month1–Month4 estimates within the specified dimension (e.g. demand group) is calculated.
4) The estimates are indexed to the average estimate value and the indexes are converted back to original scale:
   a. Seasindx1=exp(estimate of Month1–avg. estimate of Month1)
   b. Seasindx2=exp(estimate of Month2–avg. estimate of Month2)
   c. Seasindx3=exp(estimate of Month3–avg. estimate of Month3)
   d. Seasindx4=exp(estimate of Month4–avg. estimate of Month4)
5) The average of the four normalized estimates is output as the Final Seasonality index
   a. Seasindx=Avg.(Seasindx1, Seasindx2, Seasindx3, Seasindx4)

b. The values for Seasindx will be centered around 1.0, and typically range from 0.7 to 1.3.

6) After estimating individual holidays, combine estimates with index prior to tool export Imputed Promotional Variable Another useful variable is a variable which can predict promotional effects. FIG. 19A provides a flowchart illustrating an embodiment enabling the generation of imputed promotional variables in accordance with the principles of the present invention. Such a variable can be imputed using actual pricing information, actual product unit sales data, and calculated value for average base units (as calculated above). This leads to a calculation of an imputed promotional variable which takes into consideration the entire range of promotional effects.

Figure 10A:
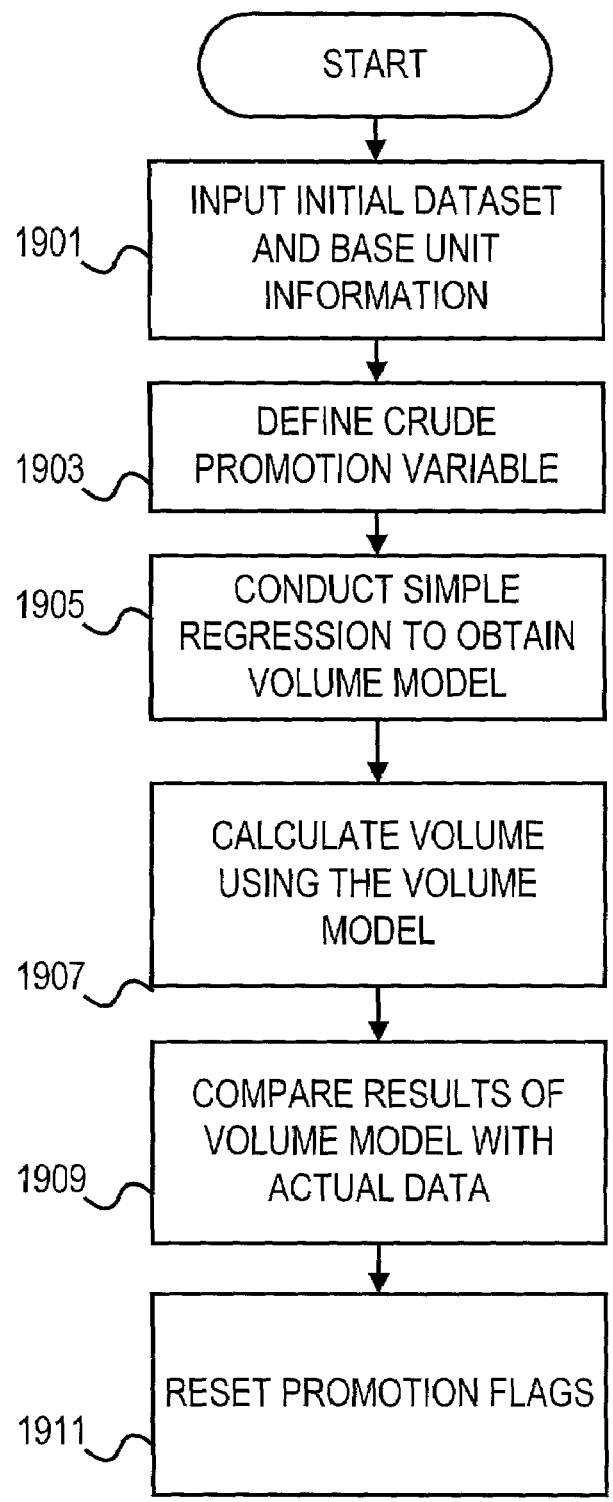
FIG. 10A is a flow chart depicting a process flow by which an imputed promotional effects variable can be generated in accordance with an embodiment of the present invention.
Figure 10B:
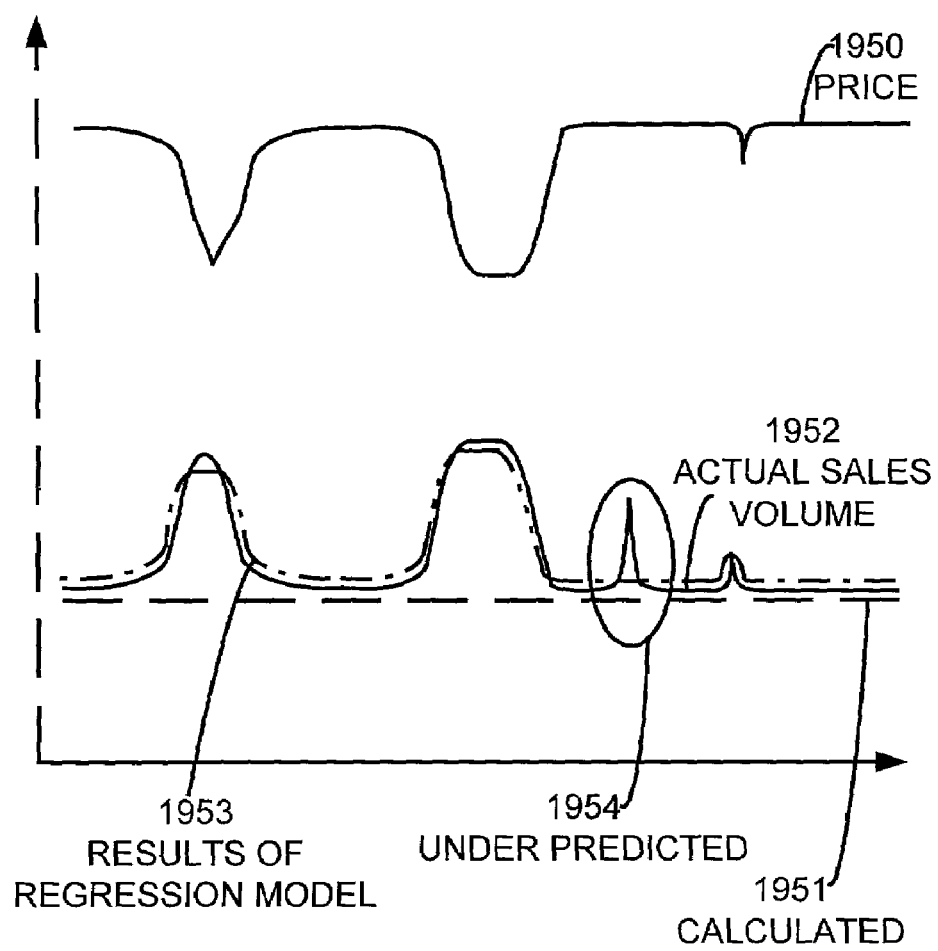
FIG. 10B is a diagram depicting the modeling effects of a promotional effects variable in accordance with an embodiment of the present invention.

FIG. 10B provides a useful pictorial illustration depicting a relationship between product price 1950, calculated average base units 1951, and actual units sold 1952 and the results of a simple regression model 1953 used to predict actual sales volume.

Referring back to FIG. 9A, the process begins by inputting the cleansed initial dataset and the calculated average base units information (Step 1901). A crude promotional variable is then determined (Step 1903). Such a crude promotional variable can be defined using promotion flags. These promotion flags may be set by an analysis of the unit sales for each date. If the actual unit sales (1952 of FIG. 10B) are greater than two (2) STD's from the average base units value (1951 of FIG. 10B) for the same date, then the price is examined. If the price for the same date has zero discount or a small discount (e.g., less than 1%) and no other promotional devices (other than discount) are involved (based on promotional information provided by the client), then the promotional flag is set to "1". For all other dates, if the above-mentioned conditions are not met the promotional flag is set to "0" for those dates. This set of "0's" or "1's" over the modeled time period defines a crude promotional variable. A simple regression analysis, as is known to those having ordinary skill in the art, (e.g., a mixed effects regression) is run on sales volume to obtain a model for predicting sales volume (Step 1905). This analysis will be designed to estimate the impact on sales volume of: price discount; the crude promotion variable; and other client supplied promotion including, but not limited to, advertisements, displays, and couponing. Using the model a sample calculation of sales volume is performed (Step 1907). The results of the model 1953 are compared with the actual sales data 1952 to further refine the promotion flags (Step 1909). If the sales volume is underpredicted (by the model) by greater than some selected percentage (e.g., 30–50%, preferably 30%) the promotion flag is set to "1" to reflect the effects of a probable non-discount promotional effect. For example, if we refer to the region shown as 1954, and the predicted sales volume is 60 units but the actual sales volume was 100 units, the model has underpredicted the actual sales volume by 40%, greater than the preselected level of 30%. Therefore, for that date the promotion flag is set to "1". This will reflect the likelihood that the increase in sales volume was due to a non-discount promotional effect. Since the remaining modeled results more closely approximate actual sales behavior, the promotion flags for those results are not reset and remain at "0" (Step 1911). The newly defined promotion flags are incorporated into a new model for defining the imputed promotional variable.

Imputed Cross-Elasticity Variable

Figure 11:
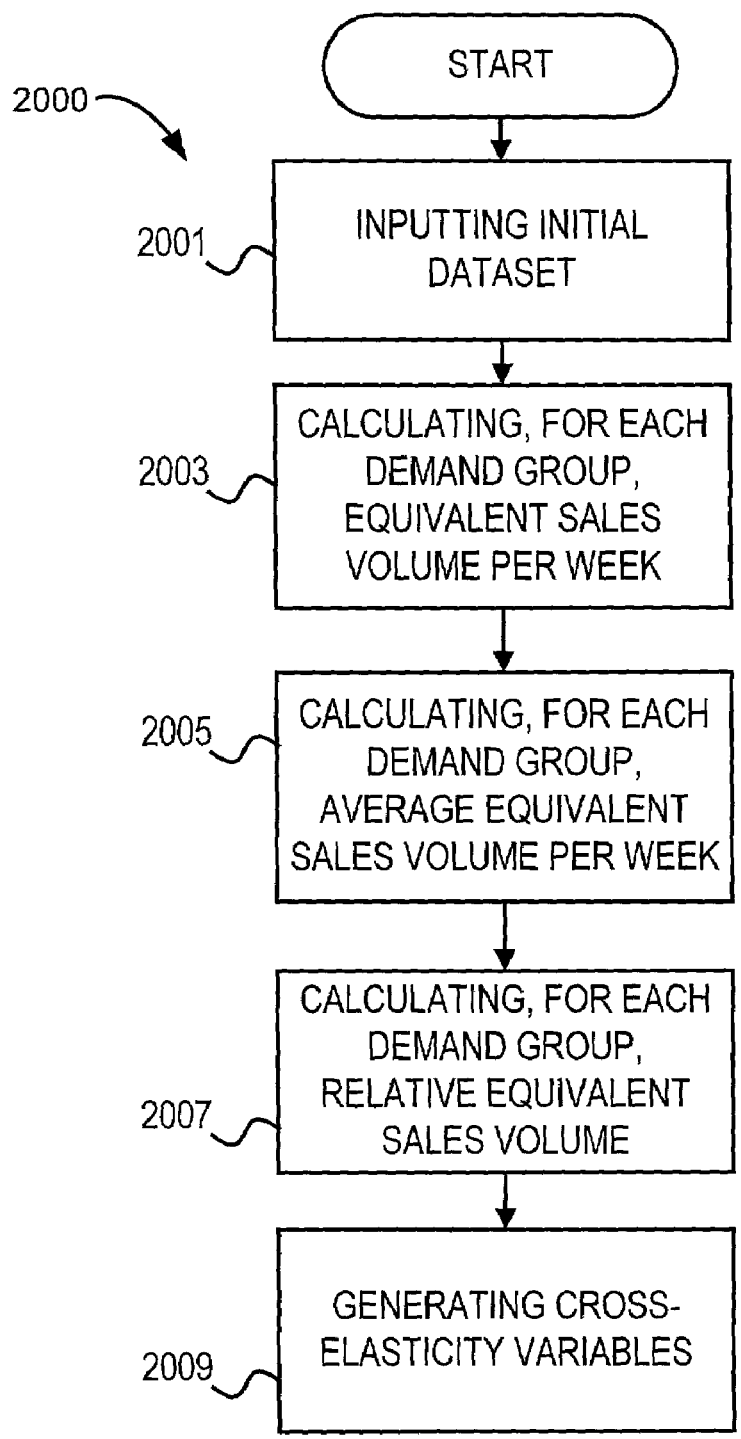
FIG. 11 is a flow chart depicting a process flow by which an imputed cross-elasticity variable can be generated in accordance with a preferred embodiment of the present invention.

Another useful variable is a cross-elasticity variable. The purpose of cross-elasticity variables is to model sales volume of one demand group as a function of other related (complementary) demand groups. FIG. 11 depicts a flowchart 2000 illustrating the generation of cross-elasticity variables in accordance with the principles of the present invention. The generation of an imputed cross-elasticity variable allows the analysis of the effects of a demand group on other demand groups within the same category. Here, a category describes a group of related demand groups which encompass highly substitutable products and complementary products. Typical examples of categories are, among many others, Italian foods, breakfast foods, or soft drinks.

An embodiment for generating cross-elasticity variables in accordance with the principles of the present invention will be illustrated with reference to the following example. The subject category is an abbreviated soft drink category defined by demand groups for diet soft drinks (diet), regular cola soft drinks (reg), caffeine free soft drinks (caff-free), and root beer soft drinks (RB).

The initial dataset information is input into the system (Step 2001). For each demand group the total equivalent sales volume for each store is calculated for each time period (for purposes of this illustration the time period is a week) during the modeled time interval (Step 2003). For each demand group, the average total equivalent sales volume for each store is calculated for each week over the modeled time interval (Step 2005). For each week and each demand group, the relative equivalent sales volume for each store is calculated (Step 2007). This is calculated for each store for each week in accordance with the formula below:

Relative Demand Group Equivalent Volume=Total Equivalent Sales Volume For a Specific Week divided by Average Total Equivalent Sales Volume as Calculated For All Weeks in The Modeled Time Interval.

The purpose of the cross-elasticity variable is to quantify the effects of sales of one demand group upon the sales of another demand group. Therefore, when examining a first demand group, the sales of other demand groups within the same category are treated as variables which affect the sales of the first demand group. As such, the relative demand group equivalent sales volume for the other demand groups is quantified and treated as a variable in the calculation of sales volume of the first demand group, thereby generating cross-elasticity variables (Step 2009). This can be illustrated more easily with reference to the partial dataset illustrated in Tables A and B. These tables reflect one week's data (week 1).

TABLE A

| WEEK | PRODUCT | DEMAND GROUP | RELATIVE DEMAND GROUP EQUIVALENT VOLUME |
|---|---|---|---|
| 1 | A | Diet | $\dfrac{\text{VolA} + \text{VolB} + \text{VolC}}{\text{avg.}(\text{VolA} + \text{VolB} + \text{VolC})}$ |
| 1 | B | Diet | " |
| 1 | C | Diet | " |
| 1 | D | Regular | $\dfrac{\text{VolD} + \text{VolE} + \text{VolF}}{\text{avg.}(\text{VolD} + \text{VolE} + \text{VolF})}$ |
| 1 | E | Regular | " |
| 1 | F | Regular | " |
| 1 | G | Caff-free | $\dfrac{\text{VolG} + \text{VolH} + \text{VolI}}{\text{avg.}(\text{VolG} + \text{VolH} + \text{VolI})}$ |

TABLE A-continued

| WEEK | PRODUCT | DEMAND GROUP | RELATIVE DEMAND GROUP EQUIVALENT VOLUME |
|---|---|---|---|
| 1 | H | Caff-free | " |
| 1 | I | Caff-free | " |
| 1 | J | RB | $\dfrac{\text{VolJ} + \text{VolK} + \text{VolL}}{\text{avg.}(\text{VolJ} + \text{VolK} + \text{VolL})}$ |
| 1 | K | RB | " |
| 1 | L | RB | " |

TABLE B

| PRODUCT | DEMAND GROUP | $CE_{Diet}$ | $CE_{Regular}$ | $CE_{caff\text{-}free}$ | $CE_{RB}$ |
|---|---|---|---|---|---|
| A | Diet | — | X | X | X |
| B | Diet | — | X | X | X |
| C | Diet | — | X | X | X |
| D | Regular | X | — | X | X |
| B | Regular | X | — | X | X |
| F | Regular | X | — | X | X |
| G | Caff-free | X | X | — | X |
| H | Caff-free | X | X | — | X |
| I | Caff-free | X | X | — | X |
| J | RB | X | X | X | — |
| K | RB | X | X | X | — |
| L | RB | X | X | X | — |

With reference to Table A it is shown that a calculation of Relative Demand Group Equivalent Volume for product A (a diet soda) is the total of all equivalent sales volume for the diet soda demand group for the time period (here week 1). This includes the sum of all equivalent sales volume for diet soda A, all equivalent sales volume for diet soda B, and all equivalent sales volume for diet soda C. This sum is divided by the average sum of equivalent sales volume for diet soda A, diet soda B, and diet soda C. This Relative Demand Group Equivalent Volume is a cross-elasticity coefficient ($CE_{diet}$) for products other than diet soda (here, regular soda, caffeine-free soda, and root beer). The same type of calculation is performed with respect to regular soda (reg) and, for that matter, Caffeine-Free (caff-free) and Root Beer (RB) as well. This yields four cross-elasticity coefficients ($CE_{diet}$, $CE_{reg}$, $CE_{caff\text{-}free}$, and $CE_{RB}$). Table B illustrates the relationship between each product, demand group, and the four cross-elasticity coefficients ($CE_{diet}$, $CE_{reg}$, $CE_{caff\text{-}free}$, and $CE_{RB}$). The cross-elasticity coefficients are used generate cross-elasticity variables for each product. In Table B the "—" means the indicated cross-elasticity coefficient is not applicable to the indicated product. An "x" means the indicated cross-elasticity coefficient is applicable to the indicated product. For example, if product D (Regular soft drink) is examined, beginning with Table A, the equation for Relative Demand Group Equivalent Volume (for product A) is shown. This equation also yields the cross-elasticity coefficient ($CE_{reg}$) for the demand group regular soda. Referring now to Table B, the row for product D is consulted. There are "x's" for the coefficients which apply to a determination of a cross-elasticity variable for product D. Thus, cross-elasticity for product D is a function of cross-elasticity coefficients $CE_{diet}$, $CE_{caff\text{-}free}$, and $CE_{RB}$. Therefore, the cross-elasticity variable for product D includes cross-elasticity coefficients $CE_{diet}$, $CE_{caff\text{-}free}$, and $CE_{RB}$.

Figure 12A:
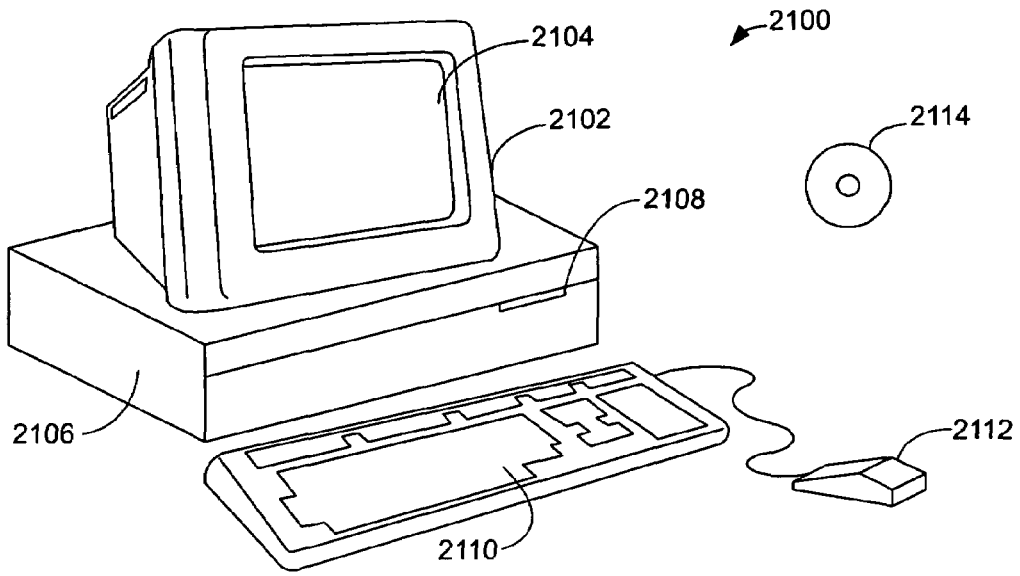
FIG. 12A is a schematic diagram of a computer system which may be used to implement the principles of the present invention.
Figure 12B:
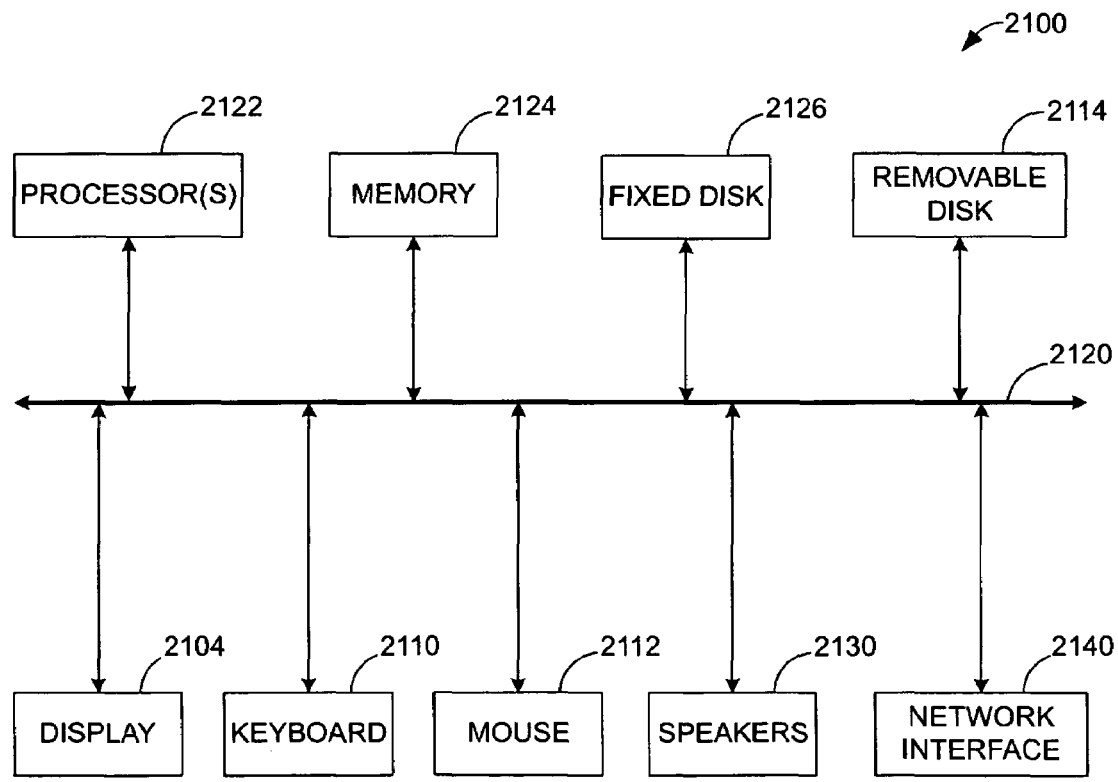
FIG. 12B is a block diagram of a computer network embodiment which may be used to implement the principles of the present invention.

FIGS. 12A and 12B illustrate a computer system 2100, which may form a part of a computer network. The computer system 2100 provides a satisfactory means of implementing the various data cleansing, initial dataset generation, and imputed variable generation embodiments of the disclosed herein. FIG. 12A shows one possible physical form of the computer system 2100. Of course, the computer system may have many physical forms ranging from an integrated circuit, a printed circuit board, and a small handheld device up to massive supercomputers. Computer system 2100 includes, for example, a monitor 2102, a display 2104, a housing 2106, a disk drive 2108, a keyboard 2110, and a mouse 2112. Disk 2114 is a computer-readable medium used to transfer data to and from computer system 2100. In particular, the disk 2114 may contain computer readable instructions enabling the computer system to implement the various aspects and embodiments of the present invention.

FIG. 12B is an example of a block diagram for computer system 2100. Attached to system bus 2120 are a wide variety of subsystems. Processor(s) 2122 (also referred to as central processing units, or CPUs) are coupled to storage devices including memory 2124. Memory 2124 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 2126 is also coupled bi-directionally to CPU 2122; it provides additional data storage capacity and may also include any of the computer-readable media described below. A fixed disk 2126 may be used to store programs, data, and the like and is typically a secondary storage medium (such as a hard disk) that is slower than primary storage. It will be appreciated that the information retained within the fixed disk 2126, may, in appropriate cases, be incorporated in standard fashion as virtual memory in memory 2124. A removable disk 2114 may take the form of, for example, any of the computer-readable media described below.

CPU 2122 is also coupled to a variety of input/output devices such as display 2104, keyboard 2110, mouse 2112 and speakers 2130. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 2122 optionally may be coupled to another computer or telecommunications network using network interface 2140. With such a network interface, it is contemplated that the CPU might receive information from the network, or might output information to the network in the course of implementing any of the process/method steps disclosed herein. Furthermore, process/method embodiments of the present invention may execute solely upon CPU 2122 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

The invention claimed is:

1. A method for imputing econometric variables from corrected raw econometric data, the method being implemented as a plurality of program instructions in a computer system, the method comprising:
   detecting, using the computer system, product parameter inconsistencies in the raw econometric data;
   correcting, using the computer system, the detected inconsistencies in the raw econometric data to generate a cleansed initial dataset; and
   generating, using the computer system, imputed econometric variables using the cleansed initial dataset.

2. The method of claim 1, wherein the imputed econometric variables include imputed variables selected from the group consisting of an imputed base price variable, an imputed relative price variable, an imputed base volume variable, an imputed variable reflecting the effects of stockpiling, an imputed variable reflecting seasonal effects, an imputed variable reflecting day-of-the-week effects, an imputed variable reflecting promotional effects, and an imputed cross-elasticity variable.

3. The method of claim 2, wherein the imputed econometric variables include imputed variables selected from the group consisting of an imputed base price variable, an imputed relative price variable, an imputed base volume variable, an imputed variable reflecting the effects of stockpiling, an imputed variable reflecting day-of-the-week effects, an imputed variable reflecting promotional effects, and an imputed cross-elasticity variable.

4. The method of claim 1, wherein imputing econometric variables include imputing a base price variable.

5. The method of claim 4, wherein imputing base price variable comprises:
   defining a time window for analyzing records of the cleansed initial dataset;
   determining an initial base based on data within the time window; and
   outputting the initial base price as the base price variable.

6. The method of claim 4, wherein imputing base price variable comprises:
   defining a time window for analyzing records of the cleansed initial dataset;
   determining an initial base price based on data within the time window;
   determining promotional effects on the initial base price based on data within the time window;
   defining a step function for initial base price based on data within the time window;
   calculating price discount variables;
   outputting initial base price step function and discount variables;
   analyzing and correcting the outputted initial base price variable based on base price distribution data and generating a refined base price variable; and
   outputting the refined base price variable.

7. The method of claim 1, wherein imputing econometric variables includes imputing a relative price variable.

8. The method of claim 7, wherein imputing relative price variable comprises:
   determining equivalent price for price values in the cleansed initial dataset;
   determining equivalent units for units values in the cleansed initial dataset;
   calculating values for equivalent base price and equivalent base units;
   determining a weighted equivalent average price;
   determining a weighted equivalent average base price;
   calculating moving averages for relative equivalent price and relative equivalent base price; and
   outputting relative equivalent price and relative equivalent base price as relative price variables.

9. The method of claim 1, wherein imputing econometric variables includes imputing a base volume variable.

10. The method of claim 9, wherein imputing base volume variable comprises:
    analyzing the cleansed initial dataset to determine non-promoted dates;
    calculating average sales volume during the non-promoted dates;
    determining an initial units value based on the cleansed initial dataset and the calculated average sales volume during the non-promoted dates;
    determining a moving average value for initial units; and
    outputting the moving average value for initial units as the imputed base volume variable.

11. The method of claim 1, wherein imputing econometric variables includes imputing a variable reflecting the effects of stockpiling.

12. The method of claim 1, wherein imputing econometric variables includes imputing a variable reflecting day-of-the-week effects.

13. The method of claim 12, wherein imputing variable reflecting day-of-the-week effects comprises:
    assigning each record of the cleansed initial dataset to a specific day of the week;
    specifying an input dimension;
    summing each assigning record over the specified input dimension;
    determining, for each specific day of the week, an average amount of units sold for each day; and
    determining for each day of the week, using actual daily units sold divided by average amount of units sold for each day, a relative daily volume of units sold variable.

14. The method of claim 1, wherein imputing econometric variables includes imputing variable reflecting promotional effects.

15. The method of claim 14, wherein imputing variable reflecting promotional effects comprises:
    using cleansed initial dataset and calculated values for base units, determining crude promotional variable;
    conducting simple regression analysis to obtain initial volume model;
    comparing sales volume results generated by the initial volume model with actual sales volume; and
    adjusting initial volume model to reflect inconsistencies between the initial volume model and the actual sales volume to generate a corrected volume model, which comprises an imputed, promotional affects variable.

16. The method of claim 1, wherein imputing econometric variables includes imputing a cross-elasticity variable.

17. The method of claim 16, wherein imputing cross-elasticity variable comprises:
    inputting demand group information from the cleansed initial dataset;

calculating equivalent sales volume for each demand group per time period;

calculating average equivalent sales volume for each demand group per time period;

calculating relative equivalent sales volume for each demand group per time period; and generating cross-elasticity variables for each demand group.

18. A computer-readable medium having programming instructions arranged to impute econometric variables from raw econometric data, the computer readable medium including:

programming instructions for receiving the raw econometric data;

programming instructions for detecting product parameter inconsistencies in the raw econometric data;

programming instructions for correcting the detected inconsistencies in the raw econometric data to generate a cleansed initial dataset; and programming instructions for generating imputed econometric variables using the cleansed initial dataset.

* * * * *